(12) United States Patent
Spalka et al.

(10) Patent No.: US 8,887,254 B2
(45) Date of Patent: Nov. 11, 2014

(54) DATABASE SYSTEM, COMPUTER SYSTEM, AND COMPUTER-READABLE STORAGE MEDIUM FOR DECRYPTING A DATA RECORD

(75) Inventors: Adrian Spalka, Koblenz (DE); Jan Lehnhardt, Koblenz (DE)

(73) Assignee: Compugroup Medical AG, Koblenz (DE)

( * ) Notice: Subject to any disclaimer, the term of this patent is extended or adjusted under 35 U.S.C. 154(b) by 521 days.

(21) Appl. No.: 12/968,537

(22) Filed: Dec. 15, 2010

(65) Prior Publication Data

US 2011/0173455 A1    Jul. 14, 2011

(30) Foreign Application Priority Data

Dec. 18, 2009  (EP) .................... 09179974
Mar. 11, 2010  (EP) .................... 10156171
Jun. 29, 2010  (EP) .................... 10167641
Aug. 18, 2010  (EP) .................... 10173163
Aug. 18, 2010  (EP) .................... 10173175
Aug. 18, 2010  (EP) .................... 10173198
Dec. 13, 2010  (EP) .................... 10194686

(51) Int. Cl.
*G06F 11/30* (2006.01)

(52) U.S. Cl.
USPC ............... 726/7; 370/389; 713/155; 713/170; 713/176; 713/189; 380/282; 380/285; 380/277; 726/30; 705/25; 705/80; 707/747; 707/791; 707/798

(58) Field of Classification Search
CPC ........... G06F 11/30; G06F 21/24; H04L 9/08; G06Q 10/08; G08B 13/14
USPC ................. 713/189, 156; 340/572.1; 380/277
See application file for complete search history.

(56) References Cited

U.S. PATENT DOCUMENTS 4,864,616 A    9/1989  Pond et al.
4,879,747 A   11/1989  Leighton et al.
(Continued)

FOREIGN PATENT DOCUMENTS

DE    10134489 A1    1/2003
DE    10258769       6/2004
(Continued)

OTHER PUBLICATIONS

Bresson et al., "Dynamic Group Diffie-Hellman Key Exchange under Standard Assumptions", 2002.*
(Continued)

*Primary Examiner* — Tamara T Kyle
*Assistant Examiner* — Ondrej Vostal

(57) ABSTRACT

A database system comprising: a memory containing multiple data records, wherein each of the data records has a data record asymmetric key pair for cryptographic encryption and decryption, wherein each data record asymmetric key pair comprises a data record public key and a data record private key, wherein the data contained in each of the multiple data records is encrypted by the data record public key, wherein the data record private key of each data record asymmetric key pair is encrypted with the public key of another asymmetric key pair; a set of user accounts, wherein each of the user accounts has a user asymmetric key pair for encryption and decryption, wherein each user asymmetric key pair has a user public key and a user private key; wherein data is added to a data record by encrypting it with the data record public key; wherein access to the data record is granted to a user account by encrypting the data record private key with the public key of an asymmetric cryptographic key pair whose encrypted private key is accessible from the user account via a sequence of successive decryptions of encrypted private keys; and wherein the data record private key allows decryption of the data record.

16 Claims, 10 Drawing Sheets

(56) References Cited

U.S. PATENT DOCUMENTS

| | | | |
|---|---|---|---|
| 5,210,795 A * | 5/1993 | Lipner et al. | 713/187 |
| 5,721,781 A | 2/1998 | Deo et al. | |
| 5,754,675 A | 5/1998 | Valadier | |
| 5,832,091 A | 11/1998 | Tomko et al. | |
| 6,031,910 A * | 2/2000 | Deindl et al. | 380/255 |
| 6,167,521 A * | 12/2000 | Smith et al. | 726/21 |
| 6,212,519 B1 | 4/2001 | Segal | |
| 6,230,269 B1 | 5/2001 | Spies et al. | |
| 6,299,062 B1 | 10/2001 | Hwang | |
| 6,523,116 B1 | 2/2003 | Berman | |
| 6,529,886 B1 | 3/2003 | Campana | |
| 6,532,472 B1 | 3/2003 | Arrouye et al. | |
| 6,687,375 B1 | 2/2004 | Matyas et al. | |
| 6,754,655 B1 | 6/2004 | Segal | |
| 6,904,150 B1 | 6/2005 | Dent | |
| 6,950,523 B1 | 9/2005 | Brickell et al. | |
| 6,959,381 B2 * | 10/2005 | Wheeler et al. | 713/155 |
| 6,963,859 B2 * | 11/2005 | Stefik et al. | 705/51 |
| 6,988,088 B1 | 1/2006 | Miikkulainen et al. | |
| 7,050,584 B1 | 5/2006 | Hoffmann et al. | |
| 7,181,017 B1 | 2/2007 | Nagel et al. | |
| 7,254,709 B1 | 8/2007 | Richard | |
| 7,266,699 B2 * | 9/2007 | Newman et al. | 713/182 |
| 7,393,532 B1 * | 7/2008 | de Sauvage et al. | 424/144.1 |
| 7,502,469 B2 | 3/2009 | Antoine | |
| 7,548,621 B1 | 6/2009 | Smith et al. | |
| 7,590,236 B1 | 9/2009 | Boneh et al. | |
| 7,634,091 B2 * | 12/2009 | Zhou et al. | 380/277 |
| 7,634,817 B2 | 12/2009 | Anderson | |
| 7,643,817 B2 | 1/2010 | Klug et al. | |
| 7,742,932 B2 | 6/2010 | Segal | |
| 7,752,443 B2 * | 7/2010 | Genty et al. | 713/170 |
| 7,844,717 B2 | 11/2010 | Herz et al. | |
| 7,894,448 B1 * | 2/2011 | Lillibridge et al. | 370/395.21 |
| 7,895,666 B1 * | 2/2011 | Eshghi et al. | 726/30 |
| 7,952,443 B2 * | 5/2011 | Chang et al. | 331/108 R |
| 7,958,362 B2 * | 6/2011 | Hwang | 713/176 |
| 7,962,761 B1 | 6/2011 | Spalka et al. | |
| 8,024,581 B2 | 9/2011 | Spalka et al. | |
| 8,137,922 B2 | 3/2012 | Dieplinger et al. | |
| 8,145,718 B1 * | 3/2012 | Kacker et al. | 709/206 |
| 8,224,979 B2 | 7/2012 | Herz et al. | |
| 8,266,435 B2 | 9/2012 | Spalka et al. | |
| 8,516,267 B2 | 8/2013 | Spalka et al. | |
| 8,522,011 B2 | 8/2013 | Spalka et al. | |
| 2001/0039503 A1 | 11/2001 | Chan et al. | |
| 2002/0002061 A1 | 1/2002 | Miyasaka et al. | |
| 2002/0004899 A1 | 1/2002 | Azuma | |
| 2002/0010679 A1 | 1/2002 | Felsher | |
| 2002/0021810 A1 | 2/2002 | Solinas | |
| 2002/0025045 A1 | 2/2002 | Raike | |
| 2002/0091687 A1 | 7/2002 | Eglington | |
| 2002/0103765 A1 | 8/2002 | Ohmori | |
| 2002/0133707 A1 | 9/2002 | Newcombe | |
| 2002/0184224 A1 | 12/2002 | Haff et al. | |
| 2003/0046560 A1 | 3/2003 | Inomata et al. | |
| 2003/0065776 A1 | 4/2003 | Malik et al. | |
| 2003/0115457 A1 | 6/2003 | Wildish et al. | |
| 2003/0118200 A1 | 6/2003 | Beaucoup et al. | |
| 2003/0149854 A1 | 8/2003 | Yoshino et al. | |
| 2003/0160815 A1 | 8/2003 | Muschetto | |
| 2003/0190046 A1 | 10/2003 | Kamerman et al. | |
| 2004/0025036 A1 * | 2/2004 | Balard et al. | 713/189 |
| 2004/0059925 A1 | 3/2004 | Benhammou et al. | |
| 2004/0083182 A1 | 4/2004 | Moribatake et al. | |
| 2004/0109567 A1 | 6/2004 | Yang et al. | |
| 2004/0181679 A1 | 9/2004 | Dettinger et al. | |
| 2004/0199764 A1 | 10/2004 | Koechling et al. | |
| 2005/0091341 A1 | 4/2005 | Knight et al. | |
| 2005/0138353 A1 | 6/2005 | Spies et al. | |
| 2005/0157880 A1 | 7/2005 | Kurn et al. | |
| 2005/0163320 A1 | 7/2005 | Brown et al. | |
| 2005/0163549 A1 | 7/2005 | Shima et al. | |
| 2005/0238175 A1 | 10/2005 | Plotkin et al. | |
| 2005/0273604 A1 | 12/2005 | Lai | |
| 2005/0283608 A1 | 12/2005 | Halcrow et al. | |
| 2006/0031301 A1 | 2/2006 | Herz et al. | |
| 2006/0034456 A1 | 2/2006 | McGough | |
| 2006/0095771 A1 | 5/2006 | Appenzeller et al. | |
| 2006/0106805 A1 | 5/2006 | Aaron | |
| 2006/0153364 A1 * | 7/2006 | Beeson | 380/30 |
| 2006/0153368 A1 | 7/2006 | Beeson | |
| 2006/0153370 A1 | 7/2006 | Beeson | |
| 2006/0277413 A1 * | 12/2006 | Drews | 713/189 |
| 2007/0028108 A1 | 2/2007 | Cowburn et al. | |
| 2007/0089168 A1 | 4/2007 | Wang et al. | |
| 2007/0112782 A1 | 5/2007 | Lobach et al. | |
| 2007/0118891 A1 | 5/2007 | Buer | |
| 2007/0165864 A1 | 7/2007 | Nagase et al. | |
| 2007/0198848 A1 | 8/2007 | Bjorn | |
| 2007/0206789 A1 | 9/2007 | Sotoodeh | |
| 2007/0208800 A1 | 9/2007 | Frohlich et al. | |
| 2007/0273518 A1 * | 11/2007 | Lupoli et al. | 340/572.1 |
| 2007/0294533 A1 * | 12/2007 | Toh et al. | 713/170 |
| 2008/0005086 A1 * | 1/2008 | Moore | 707/3 |
| 2008/0022361 A1 | 1/2008 | Bharadwaj et al. | |
| 2008/0040603 A1 | 2/2008 | Stedron | |
| 2008/0126794 A1 | 5/2008 | Wang et al. | |
| 2008/0148047 A1 | 6/2008 | Appenzeller et al. | |
| 2008/0152146 A1 | 6/2008 | Conrado et al. | |
| 2008/0154782 A1 | 6/2008 | Kang et al. | |
| 2008/0183656 A1 | 7/2008 | Perng et al. | |
| 2008/0247540 A1 | 10/2008 | Ahn et al. | |
| 2008/0250253 A1 * | 10/2008 | Beckwith et al. | 713/189 |
| 2008/0263050 A1 | 10/2008 | Randazzo et al. | |
| 2008/0267394 A1 | 10/2008 | Nan et al. | |
| 2008/0270579 A1 | 10/2008 | Herz et al. | |
| 2008/0301459 A1 * | 12/2008 | Ebeid | 713/180 |
| 2009/0006860 A1 | 1/2009 | Ross | |
| 2009/0041249 A1 | 2/2009 | Tanaka et al. | |
| 2009/0129600 A1 | 5/2009 | Brickell et al. | |
| 2009/0138727 A1 * | 5/2009 | Campello de Souza | 713/193 |
| 2009/0158035 A1 * | 6/2009 | Stultz | 713/160 |
| 2009/0187419 A1 | 7/2009 | Renganathan et al. | |
| 2009/0187757 A1 | 7/2009 | Kerschbaum | |
| 2009/0193250 A1 | 7/2009 | Yokota et al. | |
| 2009/0205026 A1 | 8/2009 | Haff et al. | |
| 2009/0210724 A1 | 8/2009 | Hori | |
| 2009/0240941 A1 | 9/2009 | Lee et al. | |
| 2009/0245515 A1 | 10/2009 | Bond et al. | |
| 2009/0287837 A1 * | 11/2009 | Felsher | 709/229 |
| 2009/0293116 A1 * | 11/2009 | DeMello et al. | 726/17 |
| 2010/0011410 A1 * | 1/2010 | Liu | 726/1 |
| 2010/0017593 A1 * | 1/2010 | Putz | 713/150 |
| 2010/0031025 A1 | 2/2010 | Zhang et al. | |
| 2010/0088320 A1 | 4/2010 | Fortier et al. | |
| 2010/0098256 A1 * | 4/2010 | Kirshenbaum | 380/277 |
| 2010/0131296 A1 | 5/2010 | Knutson | |
| 2010/0138655 A1 | 6/2010 | Matsui et al. | |
| 2010/0191975 A1 | 7/2010 | Chase et al. | |
| 2010/0208895 A1 * | 8/2010 | Boneh et al. | 380/278 |
| 2010/0250937 A1 | 9/2010 | Blomquist et al. | |
| 2010/0280333 A1 | 11/2010 | Parshuram et al. | |
| 2011/0004513 A1 * | 1/2011 | Hoffberg | 705/14.1 |
| 2011/0072142 A1 | 3/2011 | Herz et al. | |
| 2011/0123027 A1 | 5/2011 | Gotthardt | |
| 2011/0150212 A1 | 6/2011 | Spalka et al. | |
| 2011/0154044 A1 | 6/2011 | Spalka et al. | |
| 2011/0179286 A1 | 7/2011 | Spalka et al. | |
| 2011/0185178 A1 | 7/2011 | Gotthardt | |
| 2011/0185188 A1 | 7/2011 | Spalka et al. | |
| 2011/0191590 A1 | 8/2011 | Darbellay et al. | |
| 2011/0225114 A1 | 9/2011 | Gotthardt | |
| 2011/0268269 A1 | 11/2011 | Spalka et al. | |
| 2011/0307961 A1 | 12/2011 | de Perthuis | |
| 2012/0063592 A1 | 3/2012 | Spalka et al. | |
| 2012/0063594 A1 | 3/2012 | Spalka et al. | |
| 2012/0087494 A1 | 4/2012 | Spalka et al. | |
| 2013/0179176 A1 | 7/2013 | Gotthardt | |

FOREIGN PATENT DOCUMENTS

| | | |
|---|---|---|
| DE | 102004044892 A1 | 3/2006 |
| DE | 102004051296 B3 | 5/2006 |

(56) References Cited

FOREIGN PATENT DOCUMENTS

| | | |
|---|---|---|
| DE | 102004063962 A1 | 6/2006 |
| DE | 102006057201 A1 | 6/2008 |
| EP | 0334616 A2 | 9/1989 |
| EP | 1411514 A2 | 4/2004 |
| EP | 1657847 A1 | 5/2006 |
| EP | 1890270 A1 | 2/2008 |
| WO | WO 99/14652 A1 | 3/1999 |
| WO | WO 99/33222 A1 | 7/1999 |
| WO | WO 00/41613 A2 | 7/2000 |
| WO | WO 00/54125 A1 | 9/2000 |
| WO | WO 00/72504 A2 | 11/2000 |
| WO | WO 01/69513 A2 | 1/2002 |
| WO | WO 02/05061 A1 | 2/2002 |
| WO | WO 02/09580 A1 | 2/2002 |
| WO | WO 2007/031955 A2 | 3/2007 |
| WO | WO 2007/091002 A1 | 8/2007 |
| WO | WO 2008/059475 A1 | 5/2008 |
| WO | WO 2008/085881 A1 | 7/2008 |
| WO | WO 2009/121657 A1 | 10/2009 |

OTHER PUBLICATIONS

Schneider et al., "Implementing Trustworthy Services Using Replicated State Machines", 2005.*

Briscoe, "The Implications of Pervasive Computing on Network Design", 2006.*

Ray et al., "A Cryptographic Solution to Implement Access Control in a Hierarchy and More", 2002.*

Chinaei, "Access Control Administration with Adjustable Decentralization", 2007.*

"Elliptic Curve Cryptography", Technical Guideline TR-01111; Apr. 17, 2009, XP55011255, version 1.11; retrieved from the Internet Nov. 4, 2011:.<<https://www.bsi.bund.de/SharedDocs/Downloads/DE/BSI/Publikationen/TechnischeRich tlinien/TR03111/BSI-TR-03111_pdf.pdf?___blo b=publicationFile>>, 33 pages.

Arokiaraj, A. Rex Macedo et al., "ACS: An Efficient Address Based Cryptography Scheme for Mobile Ad Hoc Networks Security", IEEE International Conference on Computer and Communication Engineering, 2008, Piscataway, NJ, USA, May 13, 2008, pp. 52-56, XP031292749, ISBN: 978-1-4244-1691-2.

Atallah, Mikhail J., et al., "Dynamic and Efficient Key Management for Access Hierarchies," Proceedings of the 12th ACM Conference on Computer and Communications Security, Alexandria, VA, Nov. 7-11, 2005; 12 pages.

Benjumea et al., "Anonymous Attribute Certificates Based on Traceable Signatures," Internet Research, vol. 16, No. 2, Jan. 2006, pp. 120-139.

Camenisch, J. et al., "How to Win the Clone Wars: Efficient Periodic n-Times Anonymous Authentication," CCS '06, Oct. 30-Nov. 3, 2006, Alexandria, VA; Copyright 2006 ACM; 1-59593-518-5/06/0010; pp. 201-210.

Chao, Gao, "Study on Privacy Protection and Anonymous Communication in Peer-to-Peer Networks", IEEE 2009 International Conference on Multimedia Information Networking and Security, Piscataway, NJ, USA, Nov. 18, 2009, pp. 522-525, XP031592182, ISBN: 978-0-7695-3843-3.

Chothia, Tom et al., "Securing Pseudo Identities in an Anonymous Peer-to-Peer File-Sharing Network," IEEE Third International Conference on Security and Privacy in Communications Networks and the Workshops, 2007, Piscataway, NJ, USA, Sep. 17, 2007, pp. 279-282, XP031276557, ISBN: 978-1-4244-0974-7.

Chung, Y.F., et al. "Access Control in User Hierarchy Based on Elliptic Curve Cryptosystem," Science Direct Information Sciences, Amsterdam, NL LNKD-DOI: 10.1016/J.Ins.2007.08.001, Bd. 178, Nr. 1; Oct. 9, 2007, pp. 230-243, XP022289858 ISSN: 0020-0255.

Gudes, Ehud "The Design of a Cryptography Based Secure File System," IEEE Transactions on Software Engineering, vol. 6, No. 5, Sep. 1980, pp. 411-420, XP007912572.

Guinee, R. et al., "A Novel True Random Binary Sequence Generator Based on a Chaotic Double Scroll Oscillator Combination with a Pseudo Random Generator for Cryptographic Applications", 2009, IEEE Internet Technology and Secured Transactions, Nov. 9-12, 2009; ISBN: 978-1-4244-5647-5; 6 pages.

Hengartner, U. et al., "Exploiting Hierarchical Identity-Based Encryption for Access Control to Pervasive Computing Information," IEEE Proceedings of the First International Conference on Security and Privacy for Emerging Areas in Communications Networks, ISBN 0-7695-2369-2/05, 2005, 10 pages.

Hoffstein, et al., "An Introduction to Mathematical Cryptography," 2008 Spring Scient Busniess Media, LLC; ISBN 978-0-387-77993-5, pp. 60-61.

Jeng, Fuh-Gwo et al: "A practical and dynamic key management scheme for a user hierarchy", Journal of Zhejiang University Science A; an International Applied Physics & Engineering Journal, Springer, Berlin, DE, vol. 7, No. 3, Mar. 1, 2006, pp. 296-301, XP019360969, ISSN: 1862-1775, DOI: 10.1631/JZUS.2006.A0296.

Kuo, F.H. et al., "Cryptographic key assignment scheme for dynamic access control in a user hierarchy," IEEE Proceedings—Computers and Digital Techniques, vol. 146, No. 5, Sep. 22, 1999, pp. 235-240, XP006013180 ISSN: 1350-2387.

Lin, Y. et al. "Digital Signature Systems Based on Smartcard and Fingerprint Feature," Journal of Systems Engineering and Electronics, vol. 18, No. 4, 2007, received Aug. 10, 2006, pp. 825-834.

Menezes, A. et al., "Chapter 12: Key Establishment Protocols ED", Handbook of Applied Cryptography; [CRC Press Series on Discrete Mathematices and its Applications], CRC Press, Boca Raton, FL, US, pp. 489-541, Oct. 1, 1996, XP001525012, ISBN: 978-0-8493-8523-0 Retrieved from the Internet: URL:http://www.cacr.math.uwaterloo.ca/hac/.

Menezes, A. et al., "Chapter 13: Key Management Techniques ED", Handbook of Applied Cryptography; [CRC Press Series on Discrete Mathematices and its Applications], CRC Press, Boca Raton, FL, US, pp. 543-590, Oct. 1, 1996, XP001525013, ISBN: 978-0-8493-8523-0 Retrieved from the Internet: URL:http://www.cacr.math.uwaterloo.ca/hac/.

Menezes, A. et al., "Chapter 8: Public-Key Encryption ED", Handbook of Applied Cryptography; [CRC Press Series on Discrete Mathematices and its Applications], CRC Press, Boca Raton, FL, US, pp. 283-319, Oct. 1, 1996, XP001525008, ISBM: 978-08493-8523-0 Retrieved from the Internet: URL:http://www.cacr.math.uwaterloo.ca/hac/.

Montenegro, G. et al., "Statistically Unique and Cryptographically Verifiable Identifiers and Addresses", 5. JCT-VC Meeting; 96. MPEG Meeting; Mar. 16-23, 2011; Geneva; (Joint Collaborative Team on Video Coding of ISO/IEC JTC1/SC29/WG11AND ITU-T SG.16); URL: http://WFTP3.ITU.INT/AV-ARCH/JC TVC-Site/-Mar. 17, 2011, Internet Engineering Task Force, IETF, Apr. 1, 2001, XP015032660, ISSN: 0000-0004, 13 pages.

Musen, M.A. et al., "Clinical Decision-Support Systems," from "Biomedical Informatics: Computer Applications in Health Care and Biomedicine," May 25, 2006, New York, NY, pp. 698-736.

Nadehara, K. et al. "Extended Instructions for the AES Cryptography and their Efficient Implementation", 2004, IEEE Workshop on Signal Processing Systems, Oct. 13-15, 2004; pp. 152-157.

Rankl, W. et al., "Smart Card Handbook, Third Edition" 1999, John Wiley & Sons, Ltd., ISBN: 0-470-85668-8, pp. 51, 187-203, 222-244, 397-433, 441-442, 457-465.

Rare Diseases Act, Nov. 6, 2002, Public Law 107-280, 107th Congress, 5 pages.

Sandhu, R. S., "On Some Cryptographic Solutions for Access Control in a Tree Hierarchy," Proceedings 1987 Fall Joint Computer Conference on Exploring Technology: Today and Tomorrow; (Cat. No. 87CH2468-7) IEEE Computer Socienty, 1987, pp. 405-410, XP007912584 ISBN: 0-8186-0811-0.

Shamir, A: "Identity-Based Cryptosystems and Signature Schemes," Lecture Notes in Computer Science/MICCAI 2000, Springer, DE; Jan. 1, 1985, pp. 47-53, XP000675444, DOI: 10.1007/3-540-39568-7_5 ISBN: 978-3-540-24128-7.

Waters, B R et al., "Receiver Anonymity via Incomparable Public Keys," Proceedings of the 10th ACM Conference on Computer and Communications Security; Washington D.C., USA, vol. CONF. 10, Oct. 27, 2003, XP002361168, DOI: 10.1145/948109.948127 ISBN: 978-1-58113-738-5; 10 pages.

Zhang, Yang, "An Efficient Anonymous Authentication Protocol with Pseudonym Revocability", 2009 Fifth International Joint Conference on INC, IMS and IDC; IEEE Computer Society; Aug. 25, 2009, pp. 1929-1934, XP031564722, ISBN: 978-0-7695-3769-6.

* cited by examiner

US 8,887,254 B2

DATABASE SYSTEM, COMPUTER SYSTEM, AND COMPUTER-READABLE STORAGE MEDIUM FOR DECRYPTING A DATA RECORD

RELATED APPLICATIONS

This application claims the priority of:
1. European Application Number: EP10 194 686.1, filed Dec. 13, 2010;
2. European Application Number: EP10 173 198.2, filed Aug. 18, 2010;
3. European Application Number: EP10 173 175.0, filed Aug. 18, 2010;
4. European Application Number: EP10 173 163.6, filed Aug. 18, 2010;
5. European Application Number: EP10 167 641.9, filed Jun. 29, 2010;
6. European Application Number: EP10 156 171.0, filed Mar. 11, 2010; and
7. European Application Number: EP09 179 974.2, filed Dec. 18, 2009.

FIELD OF THE INVENTION

The invention is related to access control to a data record in a database, in particular controlling access using encryption.

BACKGROUND AND RELATED ART

Access control systems are used to control access to confidential files or data records. Access control systems typically employ a trusted third party to enforce or control access to data. Confidentiality and security of the data record is dependent upon the trusted third party.

PCT application PCT/EP2010/052733 describes a method of creating a set of asymmetric cryptographic key pairs. The set of key pairs has the structure of a directed graph.

SUMMARY

The invention provides for a database system, a computer system and a computer-readable storage medium in the independent claims. Embodiments are given in the dependent claims.

The invention further provides for a computer implemented method for generating a pseudonym for a user comprising: entering a user-selected secret, storing the user-selected secret in memory, computing a private key by applying an embedding and randomizing function onto the secret, storing the private key in the memory, computing a public key using the private key, the public key and the private key forming an asymmetric cryptographic key, erasing the secret and the private key from the memory, outputting the public key for providing the pseudonym.

Relying on a trusted third party may not be possible or advantageous in some situations. The computer systems of the trusted third party may be compromised. A dishonest system administrator could copy sensitive data files. A third party may be subpoenaed to provide access to the data files and so forth.

Embodiments of the invention may provide for an access control system for data without a trusted third party. Additional advantages that embodiments of the invention may provide is that access control to the data cannot be compromised by anybody who has not been given prior access to the data. These and other advantages may be accomplished by representing user groups and file system directory structures as nodes in a directed acyclic graph. The data files to be protected, which are also represented as nodes in the directed acyclic graph as well as users of the information system are, are encrypted using an asymmetric encryption algorithm. Each node of the of the graph has an unencrypted and publicly accessible public key. The public key of a node that is not a data file node is used to encrypt private keys for the next nodes along directed paths in the graph that the node is part of. These nodes inside of such paths are used to represent directories and user groups. A directed path from a node representing the user to a node representing the data record provides access to and allows decrypting of the data.

A 'computer-readable storage medium' as used herein is any storage medium which may store instructions which are executable by a processor of a computing device. The computer-readable storage medium may be a computer-readable non-transitory storage medium. The computer-readable storage medium may also be a tangible computer readable medium. In some embodiments, a computer-readable storage medium may also be able to store data which is able to be accessed by the processor of the computing device. Examples of a computer-readable storage medium include, but are not limited to: a floppy disk, a magnetic hard disk drive, a solid state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. The term computer readable-storage medium also refers to various types of recording media capable of being accessed by the computer device via a network or communication link. For example data may be retrieved over a modem, over the internet, or over a local area network.

'Computer memory' is an example of a computer-readable storage medium. Computer memory is any memory which is directly accessible to a processor. Examples of computer memory include, but are not limited to: RAM memory, registers, and register files. The term 'memory' as used herein encompasses any volatile or non-volatile electronic memory component or a plurality of electronic memory components, such as a random access memory.

Computer storage is an example of a computer-readable storage medium. Computer storage is any non-volatile computer-readable storage medium. Examples of computer storage include, but are not limited to: a hard disk drive, a USB thumb drive, a floppy drive, a smart card, a DVD, a CD-ROM, and a solid state hard drive. In some embodiments computer storage may also be computer memory or vice versa.

A 'processor' as used herein encompasses an electronic component which is able to execute a program or machine executable instructions. References to the computing device comprising 'a processor' should be interpreted as possibly containing more than one processor. The term computing device should also be interpreted to possibly refer to a collection or network of computing devices each comprising a processor. Many programs have their instructions performed by multiple processors that may be within the same computing device or which may even be distributed across multiple computing devices.

An 'asymmetric key pair' as used herein encompasses a cryptographic key pair used by an asymmetric key algorithm to encrypt and decrypt data. The asymmetric key pair comprises a public and a private key. The public key is used by the asymmetric key algorithm to encrypt data. The private key is used by the asymmetric key algorithm to decrypt data that has been encrypted in accordance with the public key. Asymmetric key algorithms are chosen such that knowledge of the public key does not, from a practical standpoint, allow calculation of the private key. Calculation of the private key is so computationally intensive that it is not practical to do so. Examples of asymmetric key algorithms or techniques which may be used are, but are not limited to: ElGamal, some elliptic curve cryptography algorithms, the Paillier cryptosystem, the RSA cryptosystem, Cramer—Shoup, NTRUEncrypt, and McEliece.

A 'database system' as used herein encompasses a computer storage or system containing data or files. Additional data or files may be added to the database. Data or files may be retrieved from the database. A 'database system' as used herein may also be referred to as a 'file system.'

In one aspect the invention provides for a database system. The database system comprises a memory containing multiple data records. The memory may be computer memory or it may be computer storage. Each of the data records has a data record asymmetric key pair for cryptographic encryption and decryption. Each data record asymmetric key pair contains a data record public key and a data record private key. The data record public key may be used for encrypting data and the data record private key may be used for decrypting this data. Each of the multiple data records is at least partially encrypted by its data record public key. For instance the data content of each of the multiple data records could be encrypted. The data record private key of each asymmetric key pair is encrypted. The data record private key may for instance be encrypted with the public key of at least one other asymmetric key pair that belongs to another entity of the database. The database further comprises a set of user accounts. Each of the user accounts has a user asymmetric key pair for encryption and decryption. Each user asymmetric key pair has a user public key and a user private key. Data is added to a data record by encrypting it with the data record public key. Access to the data record is granted to a user account by an encrypted cryptographic access key which allows decryption of the data record. For example, access to the data record may be granted to a user account by encrypting the data record private key with the public key of an asymmetric key pair whose private key is accessible for the user. Alternatively, acess to a data record may be granted by adding a directed edge to a graph representing the database system.

It may for example be determined whether an encrypted private key is accessible to a user by the fact that a directed path from the user's user account to the node containing the encrypted private key exists or not. A directed path or chain of encrypted private keys consists of a series of encrypted private keys in which the first encrypted private key can be used, when decrypted, to decrypt the second encrypted private key, which in turn can be used to decrypt the third encrypted private key and so on, until the last encrypted private key can be decrypted by the decrypted second last private key.

In some embodiments the cryptographic access key is the data record private key. In other embodiments the cryptographic access key is a cryptographic key which allows a decryption of another cryptographic key or chain of cryptographic keys which allow decryption of the data record private key.

Embodiments of this invention are advantageous because files, records or data can be added to a data record such that only a specified user or users have access to that data. Furthermore, this is accomplished without an administrator overseeing the system who has access to all of the data files. This essentially allows the storage of protected or sensitive data in a fashion which does not rely on a so-called trusted third party. This may be useful in such situations as where medical test results are deposited in the database system and access to this information is only granted to physicians or healthcare organizations which should have access to the data. This is accomplished in a system where the data itself does not need to be further protected. This for instance can be deposited in a database or file system which many users have access to. The cryptographic controls control which users have access to which data.

In another embodiment the cryptographic access key is a private key of an asymmetric key pair.

In another embodiment the memory contains a representation of a directed acyclic graph. A directed acyclic graph as used herein encompasses a graph comprising nodes which have directed line segments which indicate a path along the graph. By an acyclic graph this encompasses a graph which does not have cyclical paths. Paths along the directed acyclic graph each have a starting node and an ending node. Each starting node corresponds to one of the sets of user accounts. That is to say each user is assigned to a node and this node corresponds to a user or user account. Each ending node corresponds to one of the multiple data records. A directed path from a starting node to an ending node allows decryption of the data record using the cryptographic access key. That is to say that by following the path along the acyclic graph the cryptographic access key allows that path to be followed when combined into an algorithm for granting access and decrypting the data record.

In another embodiment the memory contains a representation of a directed acyclic graph. A directed acyclic graph as used herein encompasses a graph comprising nodes which are connected by directed edges, where two or more consecutive nodes connected by directed edges are forming a path along the graph. Each node of the graph is assigned an asymmetric cryptographic key pair, and a directed edge from a first node to a second node represents the private key of the second node encrypted with the public key of the first node, the encrypted private key of the second node being publicly accessible. By an acyclic graph this encompasses a graph which does not have cyclical paths. The node subset of the graph containing nodes that are not the target of a directed edge corresponds to the user accounts introduced before and will be called starting nodes in the following. The node subset of the graph containing nodes that are not the source of a directed edge correspond to the data records introduced before and will be called ending nodes in the following.

A directed path from a starting node to an ending node allows the user corresponding to the starting node the decryption of the data record corresponding to the ending node using the successive decryption of each encrypted node private key with the respective predecessor node's private key until the private key of the last node of the path, i.e. the ending node or data record is decrypted, thus enabling the user corresponding to the starting node to decrypt the data record corresponding to the ending node.

In another embodiment each node has a node asymmetric key pair with a node private key and a node public key. The node asymmetric key pair of the starting node is the user asymmetric key pair. The node asymmetric key pair of the ending node is the data record key pair.

In another embodiment nodes along a directed path form a chain of nodes starting at the starting node and ending at the ending node. Each of the nodes contains a node data record. The node data record comprises the node public key. The node data record further comprises the private key of the next node in the chain of nodes. The private key of the next node is encrypted using the node public key.

Nodes can be part of multiple paths, the private key of more than one other nodes can be encrypted with the node's public key, as well as the node private key can be encrypted with the respective public key of more than one other node and stored in the respective node. The encrypted private keys can also be represented by directed edges between the nodes.

This embodiment is particularly advantageous because when going from a starting node to an ending node there is a chain of encrypted private keys which each allow decryption of the respective next private key. This allows the construction of nodes which are used to emulate user groups and/or directories for organizing access control to the multiple data records. That is to say, a node that is neither a starting node nor an ending node may represent a user group node. The members of the user group represented by the user group node are those users from whose user node a path of directed edges leads to the user group node. Furthermore, a node that is neither a starting node nor an ending node may also represent a directory node. The contained objects of the directory represented by the directory node are represented by nodes that are referenced by directed edges originating from the directory node. Another aspect of the invention may be that a directory node may be referenced by a user group node but a user group node may not be referenced by a directory node.

In another aspect the invention provides for a computer system for accessing a database. The database comprises a memory containing multiple data records. Each of the data records has a data record asymmetric key pair for cryptographic encryption and decryption. Each data record asymmetric key pair comprises a data record public key and a data record private key. Each of the multiple data records is at least partially encrypted by its data record public key. The data record private key of each asymmetric key pair is encrypted. The data record private key may for example be encrypted by the public key of at least one further asymmetric key pair. The database further comprises a set of user accounts. Each of the user accounts has a user asymmetric key pair for encryption and decryption. Each user asymmetric key pair has a user public key and a user private key.

Data may be added to a data record by encrypting it with the data record public key. Access to the data record is granted to a user account by a cryptographic access key encrypted with the user public key. The cryptographic access key allows decryption of the data record.

Access may also be granted to a user account by encrypting the data record private key with the public key of an asymmetric cryptographic key pair that is owned by the user or whose private key is accessible to him.

The computer system comprises a processor. It is understood herein that a processor may refer to multi-core processors and it may also refer to processors spread across multiple computer systems. For instance various components of the code used for running the processor may be distributed across multiple machines. In some embodiments the computer system refers to a single computer or computer system and in other embodiments the computer system is multiple computers or computer systems which are possibly networked together.

In some embodiments, the computer system further comprises a computer-readable storage medium containing machine-readable instructions for execution by the processor. Execution of the instructions causes the processor to perform the step of decrypting the cryptographic access key with the user private key. Execution of the instructions further cause the processor to perform the step of using the cryptographic access key for decrypting the data record. In some embodiments the cryptographic access key directly allows decryption of the data record. In other embodiments the cryptographic access key is used to access a chain of other cryptographic private keys which are used in sequence to access and then decrypt the data record.

In some embodiments, the computer system further comprises a computer-readable storage medium containing machine-readable instructions for execution by the processor. Execution of the instructions causes the processor to perform the step of decrypting an encrypted private key with the user private key. Execution of the instructions further cause the processor to perform the step of using a decrypted private key to decrypt another encrypted private key. Execution of the instructions further cause the processor to perform the step of using a decrypted private key to decrypt the encrypted data record private key. Execution of the instructions further cause the processor to use the decrypted data record private key to decrypt the encrypted data content of the data record.

In another embodiment execution of the instructions further cause the processor to perform the step of encrypting a data portion with the data record public key. The data portion may for instance be a data file or record. Execution of the instructions further causes the processor to perform the step of writing the encrypted data portion to the data record. In this embodiment the data portion is added to the data record. In practical use this could be implemented in several different ways. The data record may for instance be a collection of different data files or records which are grouped together and each are individually encrypted with the data record public key. If a user has access to the data record public key then all of the data which comprises the data record could be grouped together and then encrypted. However, this embodiment is particularly advantageous because a user who does not have read access to a data record may nonetheless write data to the data record. For instance if a laboratory or firm performing a medical test wanted to add data to a data record which for instance represented a patient's medical record the firm could securely add the data file to the data record and all parties could be assured that only the users which are authorized to view the medical file would have access to the test results. Furthermore, since the data is encrypted with the public key the data could be first encrypted by the user and then placed into the database system. This would protect the data from being intercepted in the process of being deposited into the database for instance if the user who added the data did this across the open internet.

In another embodiment execution of the instructions further cause the processor to perform the step of digitally signing the data record before writing the encrypted data record to the database; for instance the computer system could include software for implementing a key signing authority for providing certificates for digitally signing data by users. This is particularly advantageous because it allows users to add authenticated data to the data record and other users to verify who performed the writing operation.

In another embodiment the memory contains a representation of a directed acyclic graph. Paths along the directed acyclic graph each have a starting node as defined above and an ending node as defined above. Each starting node corresponds to one of the set of user accounts. Each ending node corresponds to one of the multiple data records.

In another embodiment each node has a node asymmetric key pair with a node private key and a node public key. The node asymmetric key pair of the starting node is the user asymmetric key pair. The node asymmetric key pair of the ending node is the data record key pair.

In another embodiment the nodes along the directed path form a chain of nodes starting at the starting node and ending at the ending node. Each of the nodes contains a node data record. The node data record comprises the node public key. The data record further comprises the private key of the next node in the chain of nodes. The private key of the next node is encrypted using the node public key. The step of using the cryptographic access key for decrypting the data record comprises the step of sequentially decrypting the node private keys of the chain of nodes. The step of using the cryptographic access key for decrypting the data record further comprises the step of decrypting the data record using the data record private key.

In another embodiment the nodes along the directed path form a chain of nodes connected by the directed edges of the path starting at the starting node and ending at the ending node. Each of the nodes contains a node data record. The node data record comprises the node public key. The data record may further comprise the private key of the next node in the chain of nodes for each node chain that the node is part of. The private keys of the next nodes are encrypted using the node public key. The step of decrypting the encrypted data content of the data record comprises the step of sequentially decrypting the encrypted node private keys of the chain nodes with the private key of the respective predecessor of each node in the chain, until the encrypted data record private key is decrypted. The step of decrypting the data record content further comprises the step of decrypting the data record content using the data record private key.

In another embodiment the instructions further cause the processor to perform the step of encrypting a node private key with a user public key. The instructions further cause the processor to perform the step of writing the encrypted node private key to the database system. This embodiment is advantageous because it essentially gives the owner of the user private key access to the data which is encrypted in the node.

In another embodiment the instructions further cause the processor to perform the step of creating a new data record. The new data record may for instance be data stored in a computer memory or computer storage in a separate computer system or memory location. The instructions further cause the processor to perform the step of generating a new record asymmetric key pair. The new record asymmetric key pair comprises a new record private key and a new record public key. The instructions further cause the processor to at least partially encrypt the new data record with the new record public key. The instructions further cause the processor to perform the step of encrypting the new data record private key with the public key of a node chosen from the representation of the directed acyclic graph. The instructions further cause the processor to perform the step of writing the encrypted new data record, the new record public key and the encrypted new record private key to the memory of the database. This embodiment is advantageous because essentially the new data record has been added to the database. By writing the encrypted new record private key to the memory of the database access has been granted to users which have access to the private key of the node whose public key was used to encrypt the new record private key. This embodiment illustrates how a new data record can be added to the database system. Furthermore, new records may be added to the new database system without the interference or control of a trusted third party.

In another embodiment the instructions further cause the processor to perform the step of creating a new node key pair wherein the new node key pair is an asymmetric key pair which comprises a new node public key and a new node private key. The instructions further cause the processor to perform the step of encrypting the private key of a first existing node using the new node public key. The instructions further cause the processor to perform the step of encrypting the new node private key using the public key of a second existing node. The instructions further cause the processor to perform the step of writing the new node public key, the encrypted private key of the first existing node and the encrypted new node private key into the memory of the database system. This embodiment is advantageous because essentially a new node has been added to the database system. This creates a new chain of nodes. This provides a method of adding access to new data records and also for adding new access rights to a user of the system.

In another embodiment the instructions further cause the processor to perform the step of creating a new node key pair wherein the new node key pair is an asymmetric key pair which comprises a new node public key and a new node private key. The instructions further cause the processor to perform the possible step of encrypting each private key of one or more first existing nodes using the new node public key. The instructions further cause the processor to perform the possible step of encrypting the new node private key using each public key of one or more second existing nodes. The instructions further cause the processor to perform the step of writing the new node public key, the encrypted private keys of the first existing nodes and the encrypted new node private keys into the memory of the database system. This embodiment is advantageous because essentially a new node has been added to the database system. This creates one or more new chains of nodes. This provides a method of adding access to new data records and also for adding new access rights for existing data records to one or more users of the system.

In another embodiment a new node key pair is created only if the resulting nodes are still represented by an acyclic graph.

In another embodiment the instructions further cause the processor to perform the step of storing the decrypted node private keys in the computer-readable storage medium for further use. To start at the starting node and then to follow the chain of nodes and going through the steps of decrypting the chain of private keys may in some instances be time consuming. Storing the decrypted private keys in the computer-readable storage medium allows a user to access a data record without needing to traverse the chain of nodes again. This is advantageous from the use of machine processing power and also in reducing the access time to read the contents of a data record.

In another aspect the invention provides for a computer-readable storage medium containing machine readable instructions for execution by a processor of a computer system for accessing a database. The database comprises a memory containing multiple data records. Each of the data records has a data record asymmetric key pair for cryptographic encryption and decryption. Each data record asymmetric key pair comprises a data record public key and a data record private key. Each of the multiple data records is at least partially encrypted by its data record public key. The data record private key of each asymmetric key pair is encrypted. In some embodiments, the data record private key of each asymmetric key pair is encrypted by the public key of at least one more asymmetric cryptographic key pair.

The database further comprises a set of user accounts. Each of the user accounts has a user asymmetric key pair for encryption and decryption. Each user asymmetric key pair has a user public key and a user private key.

Data is added to a data record by encrypting it with the data record public key. In some embodiments, access to the data record is granted to a user account by encrypting the data record private key with the public key of at least one other asymmetric key pair whose private key is accessible for the user. In other embodiments access to the data record is granted to a user account by encrypting a cryptographic access key with the user public key. The cryptographic access key allows decryption of the data record.

In some embodiments execution of the instructions cause the processor to perform the step of successively decrypting encrypted private keys until the data record private key is decrypted. Execution of the instructions further cause the processor to perform the step of using the data record private key for decrypting the data record.

In other embodiments execution of the instructions cause the processor to perform the step of decrypting the cryptographic access key with the user private key. Execution of the instructions further cause the processor to perform the step of using the cryptographic access key for decrypting the data record.

The term 'user-selected secret' is understood herein as any secret data that is selected by or related to a user, such as a user-selected secret password or a secret key, such as a symmetric cryptographic key. Further, the term 'user-selected secret' does also encompass a combination of biometric data obtained from the user and a user-selected password or secret key, such as a biometric hash value of the password or secret key.

The term 'pseudonym' as used herein encompasses a user public key of one of the set of user accounts. The user public key may be used both as a user public key and as a pseudonym.

The term 'embedding function' or 'embedding component' as used herein encompasses any injective function that maps the elements of an n-dimensional space onto elements of an m-dimensional space, where n>m. For the purpose of this invention, we focus on embedding functions where m=1. In accordance with embodiments of this invention n is equal to 2 and m is equal to 1 for combining two elements onto a single element. In one embodiment, a user-selected secret and a public parameter are mapped by the embedding function to the 1-dimensional space to provide a combination of the user selected secret and a public parameter, e.g. a single number that embeds the user selected secret. This single number constitutes the embedded secret. In another embodiment, a first hash value of the user selected secret and a random number are mapped by the embedding function to the 1-dimensional space to provide the embedded secret.

A 'randomizing function' or 'randomizing component' as understood herein encompasses any injective function that provides an output of data values that are located within a predefined interval and wherein the distribution of the data values within the predefined interval is a substantially uniform distribution.

The term 'embedding and randomizing function' as used herein encompasses any function that implements both an embedding function and a randomizing function.

Embodiments of the present invention are particularly advantageous as an extremely high degree of protection of the informational privacy of users is provided. This is due to the fact that an assignment of the user's identity to the user's pseudonym does not need to be stored and that no third party is required for establishing a binding between the pseudonym and the user's identity. In contrast, embodiments of the present invention enable to generate a user's pseudonym in response to the user's entry of a user-selected secret whereby the pseudonym is derived from the user-selected secret. As the user-selected secret is only known by the user and not stored on any computer system there is no way that a third party could break the informational privacy of the user, even if the computer system would be confiscated such as by a government authority.

This enables to store sensitive user data, such as medical data, in an unencrypted form in a publicly accessible database. The user's pseudonym can be used as a database access key, e.g. a primary key or candidate key value that uniquely identifies tuples in a database relation, for read and write access to data objects stored in the database.

For example, the database with pseudonymous data can be used for a decision support system, e.g. in the medical field for evaluating a user's individual medical data and processing the data by rules. The result of the evaluation and processing by rules may be hints and recommendations to the physician regarding the user's health condition and further treatment.

In accordance with an embodiment of the invention, at least one public parameter is used for applying the embedding and randomization function. A public parameter may be the name of the user, an email address of the user or another identifier of the user that is publicly known or accessible. A combination of the user-selected secret and the public parameter is generated by the embedding component of the embedding and randomization function that is applied on the user-selected secret and the public parameter.

The combination can be generated such as by concatenating the user-selected secret and the public parameter or by performing a bitwise XOR operation on the user-selected secret and the public parameter. This is particularly advantageous as two users may by chance select the same secret and still obtain different pseudonyms as the combinations of the user-selected secrets with the user-specific public parameters differ.

In accordance with an embodiment of the invention, the embedding component of the embedding and randomizing function comprises a binary cantor pairing function. The user-selected secret and the public parameter are embedded by applying the binary cantor pairing function on them.

In accordance with an embodiment of the invention, the randomizing component of the embedding and randomizing function uses a symmetric cryptographic algorithm like the Advanced Encryption Standard (AES) or the Data Encryption Standard (DES) by means of a symmetric key. This can be performed by encrypting the output of the embedding component of the embedding and randomizing function, e.g. the binary cantor pairing function, using AES or DES.

In accordance with an embodiment of the invention, the symmetric key that is used for randomization by means of a symmetric cryptographic algorithm is user-specific. If the symmetric key is user-specific, the use of a public parameter can be skipped, as well as embedding the user-selected secret and the public parameter; the randomizing function can be applied then solely on the user-selected secret. By applying a symmetric cryptographic algorithm onto the user-selected secret using a user-specific symmetric key both embedding and randomization of the user-selected secret are accomplished. If the symmetric key is not user-specific, the use of the public parameter and embedding the user-selected secret and the public parameter are necessary.

In accordance with an embodiment of the invention, the embedding and randomizing function is implemented by performing the steps of applying a first one-way function on the user-selected secret to provide a first value, providing a random number, embedding the random number and the first value to provide a combination, and applying a second one-way function on the combination to provide a second value, wherein the second value constitutes the private key. This embodiment is particularly advantageous as it provides a computationally efficient method of implementing an embedding and randomization function.

In accordance with an embodiment of the invention, the computation of the public key is performed by elliptic curve cryptography (ECC). The private key that is output by the embedding and randomizing function is multiplied with a first base point given by the domain parameters of the elliptic curve to provide another point on the elliptic curve, which is the pseudonym.

In accordance with an embodiment of the invention, it is determined whether the output of the embedding and randomizing function fulfils a given criterion. For example, it is checked whether the output of the embedding and randomization function is within the interval between 2 and n−1, where n is the order of the elliptic curve. If the output of the embedding and randomizing function does not fulfil this criterion another random number is generated and the embedding and randomization function is applied again to provide another output which is again checked against this criterion. This process is performed repeatedly until the embedding and randomizing function provides an output that fulfils the criterion. This output is then regarded as the private key that is used to calculate the public key, i.e. the pseudonym, by multiplying the private key with the first base point.

In accordance with a further embodiment of the invention the base point is varied leaving the other domain parameters unchanged for computation of multiple pseudonyms for a given user. This provides a computationally efficient way to compute multiple pseudonyms for a given user in a secure way.

In another aspect the present invention relates to a computer readable storage medium having stored therein instructions, which when executed by a computer system, cause the computer system to generate a pseudonym for a user upon a user's entry of a user-selected secret by performing the steps of storing the user-selected secret in memory, computing a private key by applying an embedding and randomizing function onto the secret, storing the private key in memory, computing a public key using the private key, the public key and the private key forming an asymmetric cryptographic key pair, erasing the secret and the private key from memory, outputting the public key for providing the pseudonym.

In another aspect the present invention relates to a computer system comprising means for entering a user-selected secret, memory means for storing the user-selected secret and a private key, processor means being operable to compute the private key by applying an embedding and randomizing function onto the secret, compute a public key using the private key, the public key and the private key forming an asymmetric cryptographic key pair, erase the secret and the private key as well as any intermediate computational results from memory, and output the public key for providing the pseudonym.

In another aspect, the invention provides for a computer implemented method for generating a pseudonym for a user comprising: entering a user-selected secret, storing the user-selected secret in memory, computing a private key by applying an embedding and randomizing function onto the secret, storing the private key in the memory, computing a public key using the private key, the public key and the private key forming an asymmetric cryptographic key, erasing the secret and the private key from the memory, and outputting the public key for providing the pseudonym.

In another embodiment the secret is selected from the group consisting of a user-selected password, a secret key, biometric data.

In another embodiment the method further comprises using at least one public parameter for applying the embedding and randomization function.

In another embodiment the public parameter is selected from the group consisting of: a username, a user email address, a user identifier. The embedding and randomizing function is applied on the public parameter and the secret to provide a combination.

In another embodiment the embedding and randomization function comprises a binary Cantor pairing function for embedding the secret.

In another embodiment the embedding and randomizing function comprises encrypting at least the embedded secret using a symmetric cryptographic algorithm by means of a symmetric key for randomizing the embedded secret.

In another embodiment the embedding and randomizing function comprises encrypting at least the secret using AES by means of a user-specific symmetric key for embedding and randomizing the secret.

In another embodiment wherein the embedding and randomizing function comprises: applying a first one-way function on the secret to provide a first value, providing a random number, embedding the random number and the first value by combining them to provide a combination, applying a second one-way function on the combination to provide a second value, wherein the second value constitutes the private key.

In another embodiment wherein the first one-way function is a first hash function, and the second one-way function is a second hash function.

In another embodiment further comprises storing the random number in a database using a public parameter assigned to the user as a database access key.

In another embodiment the computation of the public key is performed by ECC cryptography.

In another embodiment further comprising providing a set of domain parameters comprising a first base point for the ECC cryptography, computing a first public key for providing a first pseudonym by the ECC cryptography using the domain parameters and the first base point, replacing the first base point by a second base point in the domain parameters, and computing a second public key by ECC cryptography using the second base point to provide a second pseudonym.

In another embodiment the method further comprises using the pseudonym as a database access key for storing a data object in a database.

In another embodiment the method further comprises storing the pseudonym in a user profile that is assigned to the user as the username.

In another aspect the invention provides for a computer readable storage medium having stored therein instructions, which when executed by a computer system cause the computer system to generate a pseudonym for a user upon the user's entry of a user-selected secret by performing the steps of: receiving the user-selected secret, storing the user-selected secret in memory, computing a private key by applying an embedding and randomizing function onto the secret, storing the private key in the memory, computing a public key using the private key, the public key and the private key forming an asymmetric cryptographic key pair, erasing the secret and the private key from the memory, outputting the public key for providing the pseudonym.

In another aspect the invention provides for a computer system comprising a means for entering a user-selected secret. The computer system further comprises a memory means for storing the user-selected secret and a private key. The computer system further comprises a processor means being operable to: compute the private key by applying an embedding and randomizing function onto the secret, compute a public key using the private key, the public key and the private key forming an asymmetric cryptographic key pair; erase the secret and the private key from the memory; and output the public key for providing the pseudonym.

In another embodiment the computer system further comprises a database and means for performing a database access operation using the pseudonym for storing a pseudonymous data object in the database.

In another embodiment the computer system further comprises an analytic system for analyzing the pseudomized data objects stored in the database, the analytic system comprising one of a data mining or a clustering component for performing the analysis.

In another embodiment the means for computing a private key by applying an embedding and randomizing function onto the secret is implemented by a binary cantor pairing function for embedding the secret.

In another embodiment the means for computing a private key by applying an embedding and randomizing function onto the secret is operable to perform the steps of: applying a first one-way function on the secret to provide a first value, providing a random number, embedding the random number and the first value for providing a second combination, applying a second one-way function on the second combination to provide a second value, wherein the second value constitutes the private key.

BRIEF DESCRIPTION OF THE DRAWINGS

In the following embodiments of the invention are explained in greater detail, by way of example only, making reference to the drawings in which.

DETAILED DESCRIPTION

Like numbered elements in these figures are either equivalent elements or perform the same function. Elements which have been discussed previously will not necessarily be discussed in later figures if the function is equivalent.

Figure 1:
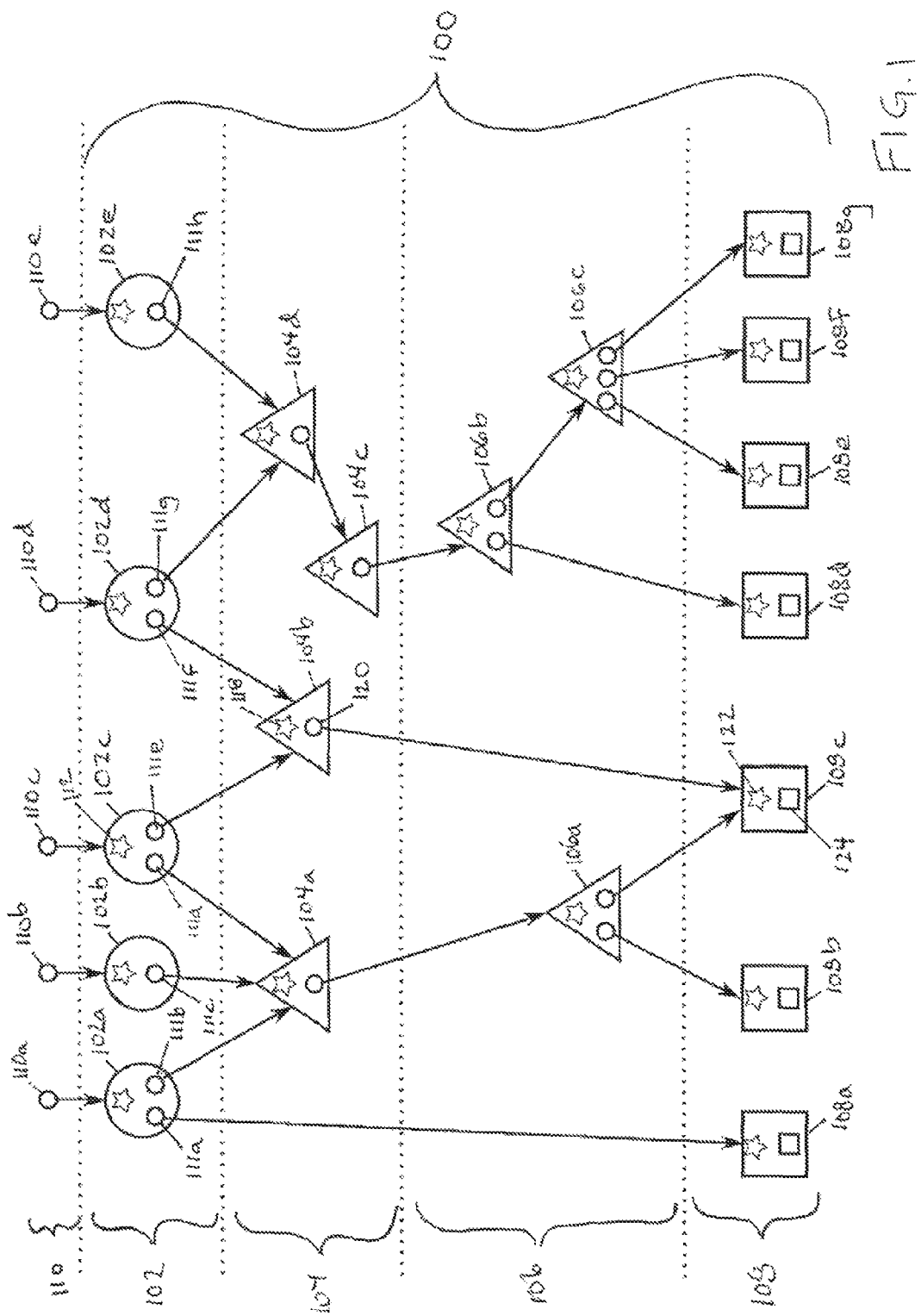
FIG. 1 shows a directed acyclic graph which illustrates the logical construction and structure of a database according to an embodiment of the invention

FIG. 1 shows a directed acyclic graph which illustrates the logical construction and structure of a database according to an embodiment of the invention. The portion of the directed acyclic graph labeled 100 models the structure of the database stored in the database system. The nodes in the region 102 correspond to user accounts and are also starting nodes. The nodes in the region 104 are intermediate nodes, that is they are neither starting nodes nor ending nodes. The nodes in the region 104 may also be considered to be representations of user groups. The nodes in the region 106 are also intermediate nodes. However, the nodes in the region 106 may also be interpreted as representations of directories. The nodes in region 108 represent data records stored in the database system. The nodes in the region 108 are also ending nodes.

This figure illustrates how the directed acyclic graph may be used to represent and control access rights of users represented by user nodes 102 to specific data files or records 108. There are five nodes in region 102 of the graph; these are labeled 102a, 102b, 102c, 102d and 102e. These represent five separate users. There are four nodes in region 104. These intermediate nodes which represent user groups are labeled 104a, 104b, 104c and 104d. There are three nodes in region 106. These intermediate nodes are labeled 106a, 106b and 106c. There are seven nodes in region 108; these are labeled 108a, 108b, 108c, 108d, 108e, 108f and 108g. In region 110 there are five user private keys. These are labeled 110a, 110b, 110c, 110d and 110e. In region 102 of the figure the nodes which represent the users 102a, 102b, 102c, 102d and 102e have access to private keys 111a, 111b, 111c, 11d, 111e, 111f, 111g and 111h which can be decrypted by the user private keys 110a, 110b, 110c, 110d and 110e. Private keys 111a and 111b can be decrypted by user private key 110a. Private key 111c can be decrypted by user private key 110b. Private keys 111d and 111e can be decrypted by user private key 110c. Private keys 111f and 111g can be decrypted by user private key 110d. Private key 111h can be decrypted by user private key 110e.

In this graph, stars represent a public key. A private key is represented by a circle. There is a directed edge attached to each private key which points to the data which the private key is able to decrypt. To explain this in greater detail the chains of nodes starting with node 102c and ending with node 108c are examined. The node 102c represents a user and that user's access to the data records 108. Within node 102c there is a public key 112 and two private keys 111d and 111e. The public key 112 is accessible to all users of the database system. The public key as are all public keys displayed in this diagram is not encrypted. The encrypted private keys 111d and 111e are encrypted using the public key 112. The encrypted private keys 111d and 111e can be read by all users of the database system. However, as these are encrypted using the public key 112 of node 102c, only someone who has access to the private key 110c may access the decrypted private keys 111d and 111e. The private keys 110 are not stored in the database. They belong to the individual users. These private keys provide access to data on the database system. The decrypted private key 111d allows the owner of private key 110c to decrypt the encrypted private key contained within node 104a. Likewise, when private key 111e is decrypted by private key 110c, private key 120, which is contained within node 104b, may then be decrypted. The private key 120 was encrypted using public key 118. The decrypted private key 111e and public key 118 form an asymmetric key pair. Once private key 120 is decrypted, private key 120 may be used to decrypt data file 124 contained in data record 108c. Data file 124 has been encrypted with public key 122. The decrypted private key 120 and public key 122 form an asymmetric cryptographic key pair.

The nodes 102c, 104b and 108c represent a chain of nodes. Using the user private key 110c and then sequentially decrypting private key 111e and then private key 120 the cryptographic access key 110c may be used to decrypt data file 124.

This figure illustrates several different ways of representing different file structures and user hierarchies. For instance the node 102a has direct access to the contents of node 108a. Nodes 102a, 102b and 102c all belong to a user group represented by node 104a, that means the private key of node 104a is encrypted respectively with the public keys of the nodes 102a, 102b and 102c, resulting in the encrypted private keys 111b, 111c and 111d. The user group which is represented by node 104a grants access to the directory represented by the node 106a, that means the private key of node 106a is encrypted with the public key of node 104a. Directory 106a provides access to two data records, data record 108b and 108c, that means the private keys of the nodes 108b and 108c are respectively encrypted with the public key of node 106a. There may also be multiple user groups and multiple directory structures. For instance nodes 102d and 102e both belong to the user group represented by node 104d. There is then a sub-user group which is represented by 104c to which these nodes 102d and 102e transitively also belong. The node 104c grants access to the directory represented by node 106b. Node 106b grants access directly to data record 108d and also grants access to a sub-directory which is represented by node 106c. The directory 106c grants access to the data records represented by the nodes 108e, 108f and 108g.

Alternatively, access can be to a data record by adding a directed edge or path to the graph 100. For example, user 110d can insert a directed edge from 104b to 108d. User 110d would do this by encrypting the private key of 108b with public key 118. By doing this, User 110d has grant user 110c access to data record 108d. Access was provided to the data record in 108d without encrypting any private key with user 110c's public key 112.

Figure 2:
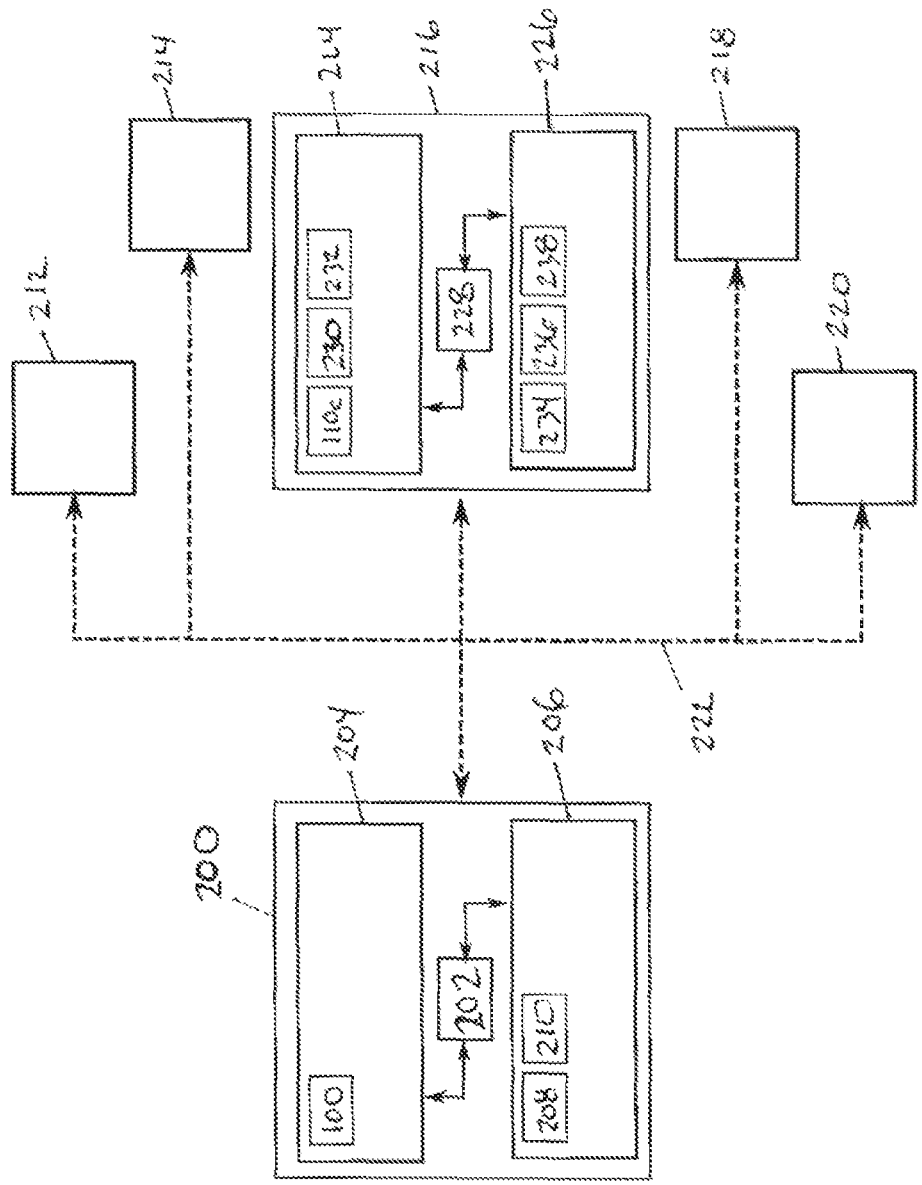
FIG. 2 illustrates a database system and a computer system, both according to an embodiment of the invention.

FIG. 2 illustrates a database system 200 according to an embodiment of the invention. The database system 200 comprises computer storage 204 and computer memory 206. The computer storage 204 contains a database 100. The database 100 is the database whose representation is shown in FIG. 1. The database system also contains a processor 202 which is connected to the computer storage 204 and the computer memory 206. The computer memory is shown as containing machine executable code 208, 210 for execution by the processor 202. Within the computer memory 206 is a program 208 which allows the processor 202 to provide access and to operate the database 100. Also within the computer memory is a key signing authority module 210. The key signing authority module 210 allows the generation and providing of certificates used by users to optionally sign data or data files which are deposited into the database 100.

Also shown are the embodiments of five computer systems 212, 214, 216, 218, 220. Each of these five computer systems 212, 214, 216, 218, 220 corresponds to a node 102a, 102b, 102c, 102d and 102e in graph 1. There is also a network 222 which connects the computer systems 212, 214, 216, 218, 220 to the database system 200. All five of the computer systems 212, 214, 216, 218, 220 are considered to be equivalent.

Only the third computer system 216 is described in detail. The third computer system 216 comprises a computer storage 224, a computer memory 226 and a processor 228. The processor 228 is able to access data in both the computer storage 224 and the computer memory 226. Within the computer storage 224 is the private key 110c. It is noted that the private key 110c is stored separately from the database 100. The user or owner of the computer system 216 is assumed to be able to control access to the computer storage 224 of the third computer system 216. This provides security which the owner of the third computer system 216 is able to control by him- or herself.

The computer storage 224 also contains a private key cache 230. If a private key is once accessed and decrypted it can be cached in the private key cache 230 for later use. Also stored within the computer storage is the decrypted version 232 of the encrypted data file 124 of FIG. 1. Within the computer memory 226 there is a computer program 234 which comprises machine executable instructions for execution by the processor 228. Execution of the program 234 enables the processor 228 to perform steps to access, write to and modify the database 100. Computer memory 226 also contains a cryptographic key generation module 236. The cryptographic key generation module allows the computer program 234 to create asymmetric key pairs. There is also a cryptographic module 238 which is stored in the computer memory 226. The cryptographic module 238 allows the computer program 234 to perform encryption and decryption using asymmetric key pairs. The cryptographic module 238 may also allow the computer program 234 to cryptographically sign files or data records.

In this embodiment the five computer systems 212, 214, 216, 218, 220 are shown as being distinct computer systems from the database system 200. In some embodiments individual computer systems may be combined.

Figure 3:
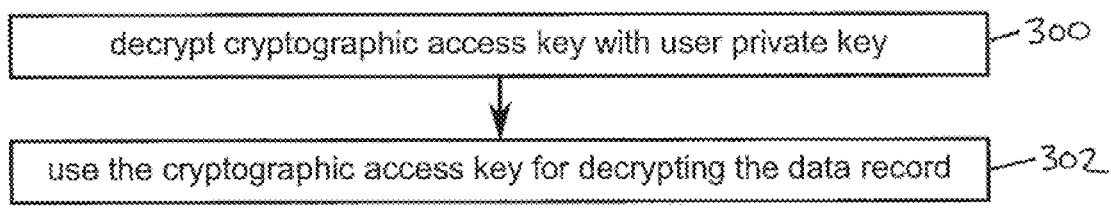
FIG. 3 shows a flow chart which illustrates an embodiment of a method according to the invention.

FIG. 3 shows a block diagram which illustrates an embodiment of a method according to the invention. In step 300 the cryptographic access key is decrypted with a user private key. In step 302 the cryptographic access key is used for decrypting the data record. In some embodiments the cryptographic access key is used for directly decrypting the data record. In other embodiments the cryptographic access key is used to start the decryption process of a chain of private keys, the last private key being used for decrypting the data record.

Figure 4:
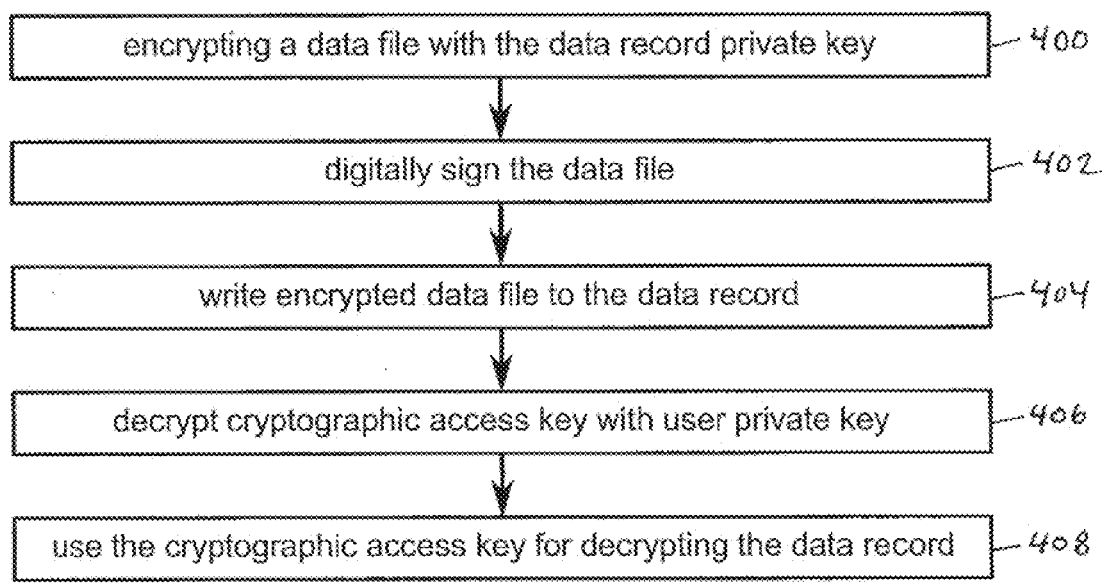
FIG. 4 shows a flow chart which illustrates a further embodiment of a method according to the invention.

FIG. 4 shows a flow diagram which illustrates a further embodiment of a method according to the invention. In step 400 a data file is encrypted with the data record public key. In step 402 the data file is digitally signed with a private key. In some embodiments the data file is signed before encryption and in some instances the data file is signed after encryption. In step 404 the encrypted data file is written to the data record. This may simply be an appending of the individually encrypted data file or it may be the case that the unencrypted data file is appended to an unencrypted version of the data record and then both are encrypted together. In step 406 a user private key is used to successively decrypt the data record private key. In step 408 the data record private key is used for decrypting the data record.

Figure 5:
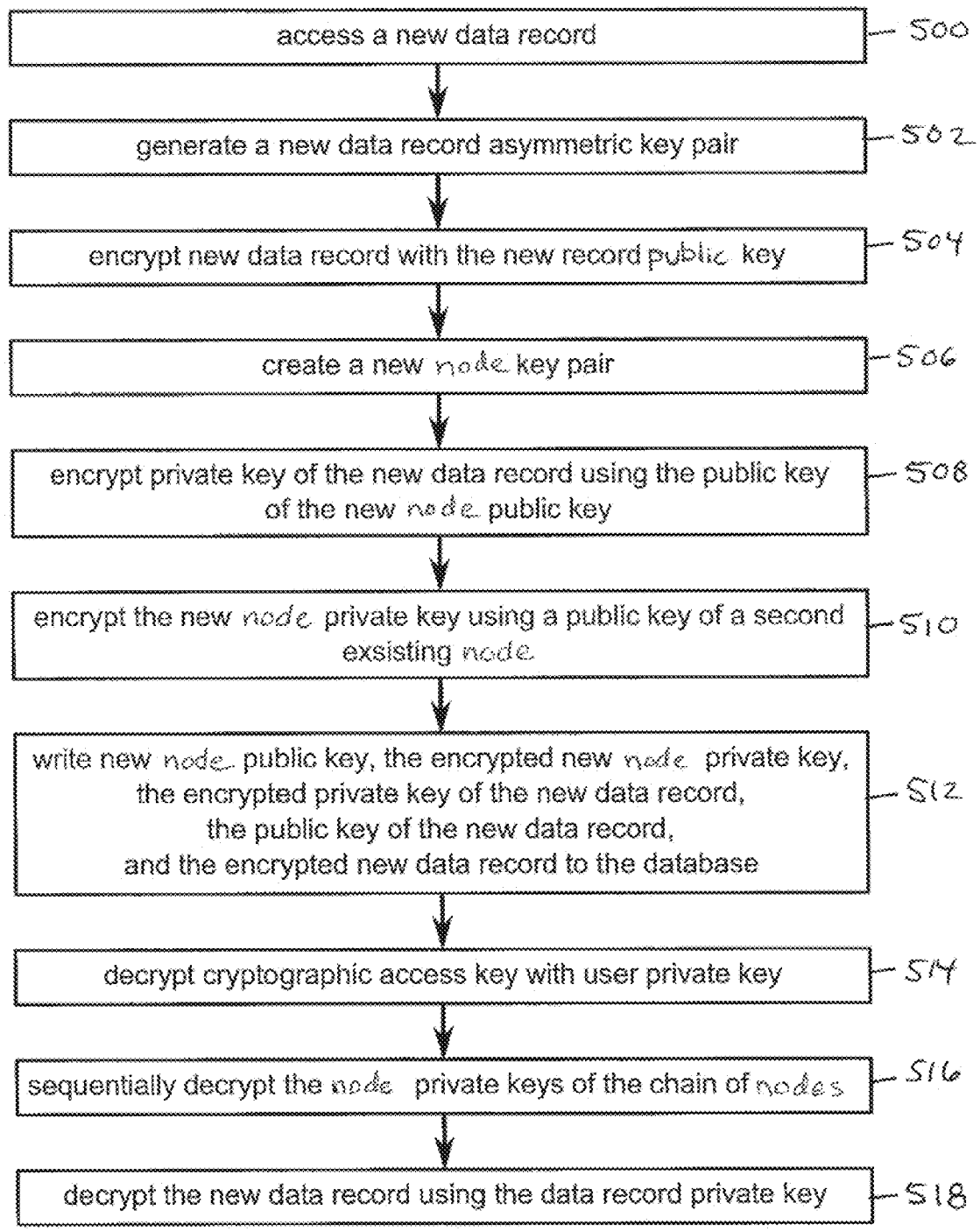
FIG. 5 shows a flow chart which illustrates a further embodiment of a method according to the invention.

FIG. 5 shows a flow diagram which illustrates a further embodiment of the method according to the invention. In step 500 a new data record is accessed. In step 502 a new data record asymmetric key pair is generated. This is an asymmetric key pair which is associated with the new data record. In step 504 the data content of the new data record is encrypted with the new record public key. In step 506 a new node key pair is created. The new node key pair is an asymmetric key pair which is being created for a new node which has been added to the directed acyclic graph. In step 508 the private key of the new data record is encrypted using the public key of the new node. In step 510 the new node private key is encrypted using the public key of a second existing node. In step 512 the new node public key, the encrypted new node private key, the encrypted private key of the new data record, the public key of the new data record and the encrypted new data record are written to the database. Essentially in steps 500-512 a new data record and a new node have been added to the directed acyclic graph. In step 516 the node private keys of a chain of nodes are sequentially decrypted. In step 518 the new data record is decrypted using the data record private key.

Figure 6:
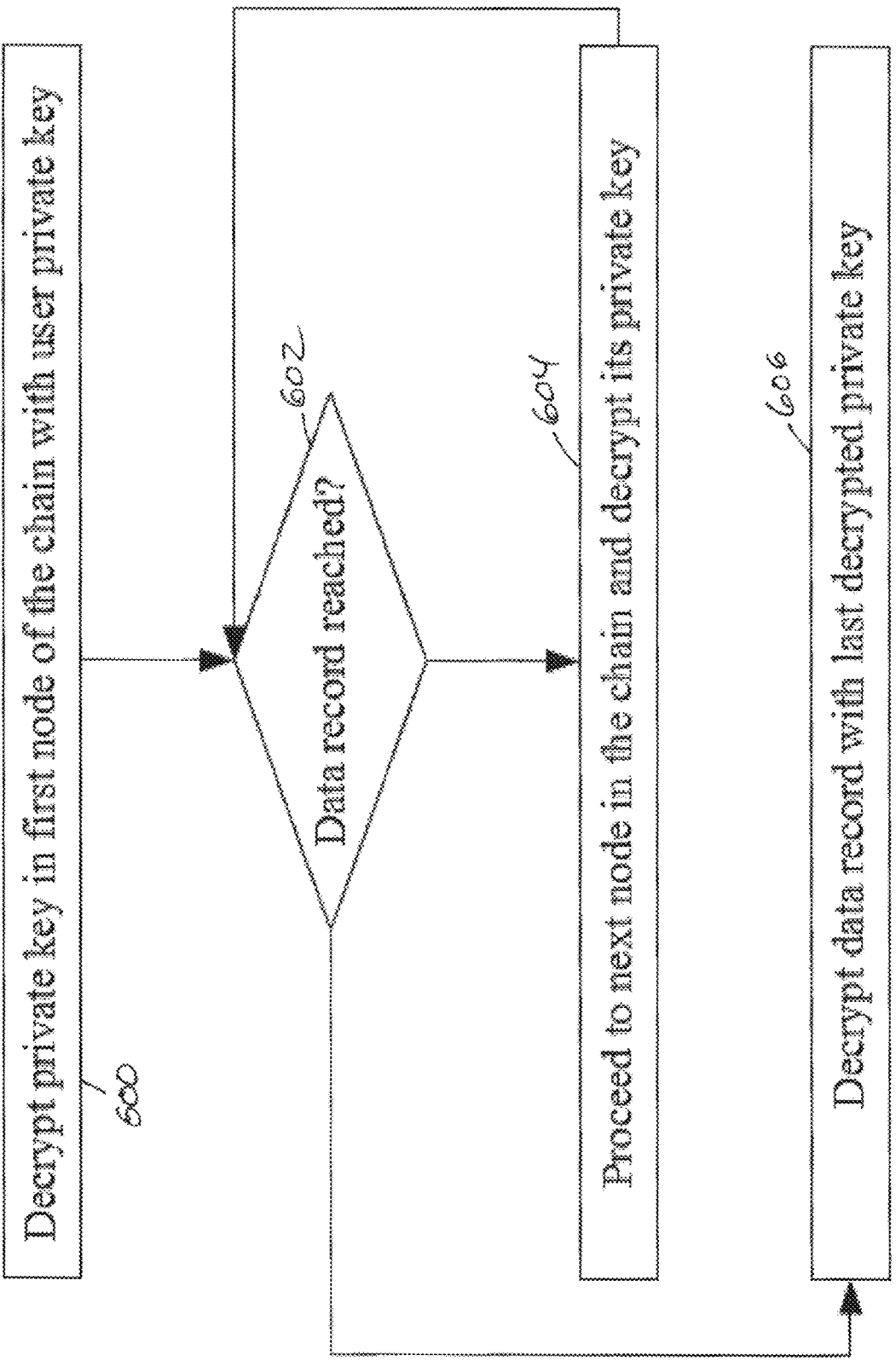

FIG. 6 shows a block diagram which illustrates an embodiment of a method according to the invention. In the block diagram the algorithm of successive decryption of encrypted private keys along a path or chain of encrypted private keys in order to decrypt encrypted data contained in a data record is modeled. In step 600 the encrypted private key of the starting node is decrypted. In the following step 602 a condition is evaluated: If the last private key that has been decrypted in the previous step belongs to the ending node of the chain the algorithm proceeds to step 606, where the data contained in the ending node, which is also the data record, is decrypted. The algorithm terminates after that. However, if the evaluation of the condition in step 602 has the result that the just decrypted private key does not belong to the ending node of the chain, i.e. that there is at least one following node in the chain from the current position, the algorithm proceeds to step 604. In step 604 the algorithm proceeds to the next node in the chain, decrypts the encrypted private key contained in the node and returns to step 602. The algorithm proceeds in the described manner until step 606 is reached, where it terminates.

Figure 7:
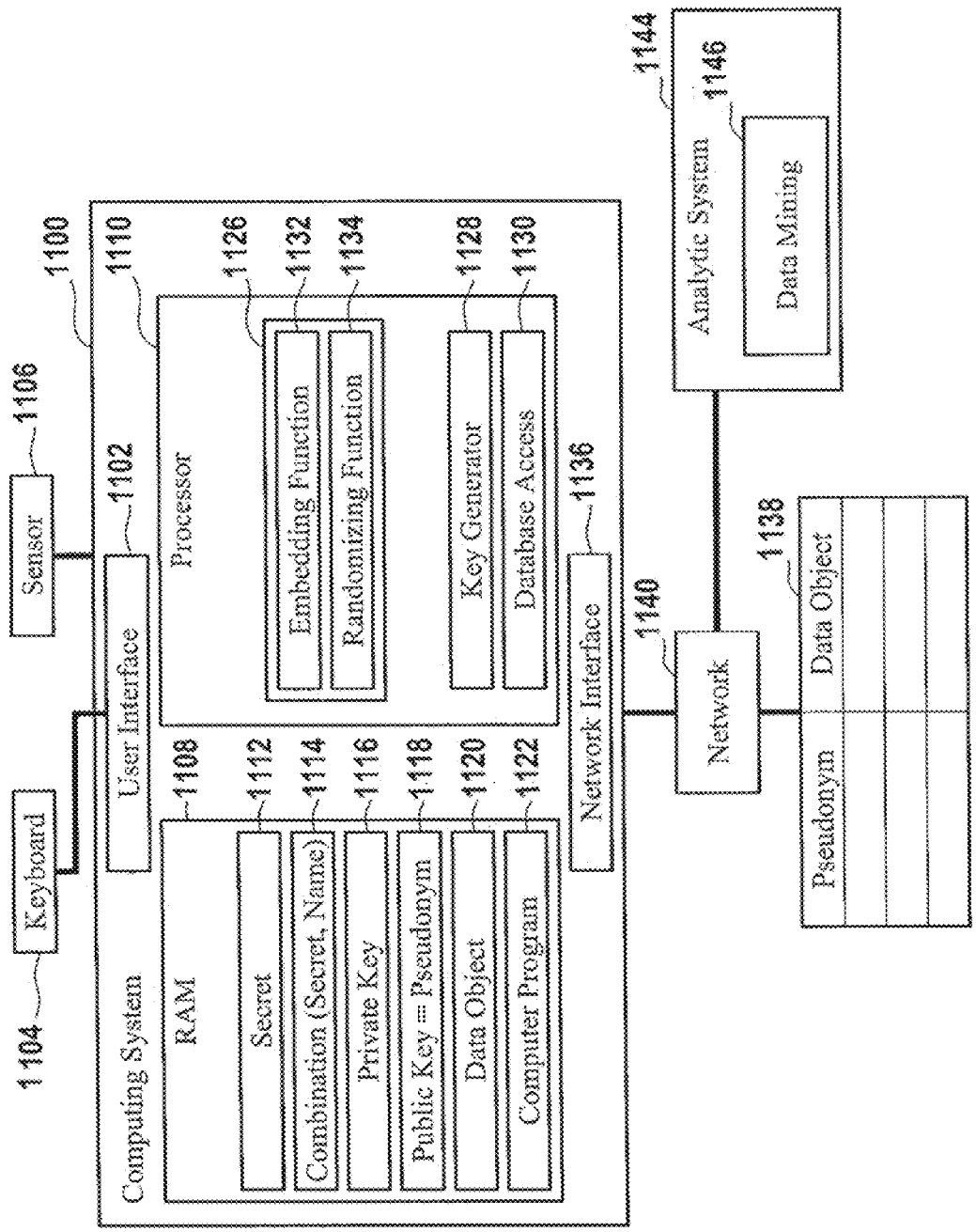
FIG. 7 is a block diagram of a further embodiment of a computer system according to the invention.

FIG. 7 shows a computer system 1100 that has a user interface 1102 for a user's entry of a user-selected secret that is designated as $s_T$ in the following. For example, a keyboard 1104 may be coupled to the computer system 1100 for entry of $s_T$. Instead of a keyboard 1104 a touch panel or another input device can be coupled to the computer system 1100 for entry of $s_T$. In addition, a sensor 1106 can be coupled to the computer system 1100 such as for capturing biometric data from a biometric feature of the user. For example, the sensor 1106 may be implemented as a fingerprint sensor in order to provide biometric fingerprint data to the computer system 1100.

In some embodiments, the computer system 1100 is identical with the computer system 200 shown in FIG. 2. In other embodiments the computer system 1100 is a external computer that connects to computer system 200 shown in FIG. 2. For instance, Computer system 216 of FIG. 2 and computer system 1100 may be identical. Not all features of computer systems 200 and 216 are shown in FIG. 2. In some embodiments all or a portion of the features of comptuer system 1100 are incorporated into computer systems 200 and/or 216 of FIG. 2.

A public parameter, such as the user's name or email address, can also be entered into the computer system 1100 via the keyboard 1104 or otherwise. For example, a personal set $V_{T,i}$ containing at least one user-specific public parameter, such as the user's name or email address, is entered into the computer system 1100 by the user $T_i$.

The computer system 1100 has a memory 1108, such as a random access memory, and at least one processor 1110. The memory 1108 serves for temporary storage of the user-selected secret $s_T$ 1112, a combination 1114 of $s_T$ 1112 and $V_{T,i}$, a private key 1116, a public key 1118 that constitutes a pseudonym of the user $T_i$, and a data object 1120, such as a medical data object containing medical data related to the user $T_i$. Further, the memory 1108 serves for loading computer program instructions 1122 for execution by the processor 1110.

The computer program instructions 1122 provide an embedding and randomizing function 1126, a key generator 1128 and may also provide a database access function 1130 when executed by the processor 1110.

The embedding and randomizing function 1126 may be provided as a single program module or it may be implemented by a separate embedding function 1132 and a separate randomizing function 1134. For example, the embedding function 1132 or an embedding component of the embedding and randomization function 1126 provides the combination 1114 by concatenating $s_T$ and the user's name or by performing a bitwise XOR operation on $s_T$ and the user's name.

In one implementation, the embedding and randomizing function 1126 implements symmetric encryption provided by a symmetric cryptographic algorithm, e.g. AES, using a user-specific symmetric key for encryption of the user-selected secret 1112. This provides both embedding and randomizing of $s_T$ 1112.

In another implementation, the embedding function 1132 is implemented by a binary cantor pairing function for embedding $s_T$ 1112 and $V_{T,i}$, and the randomizing function 1134 is implemented by AES encryption using a symmetric key that is the same for the entire set of users T.

Figure 9:
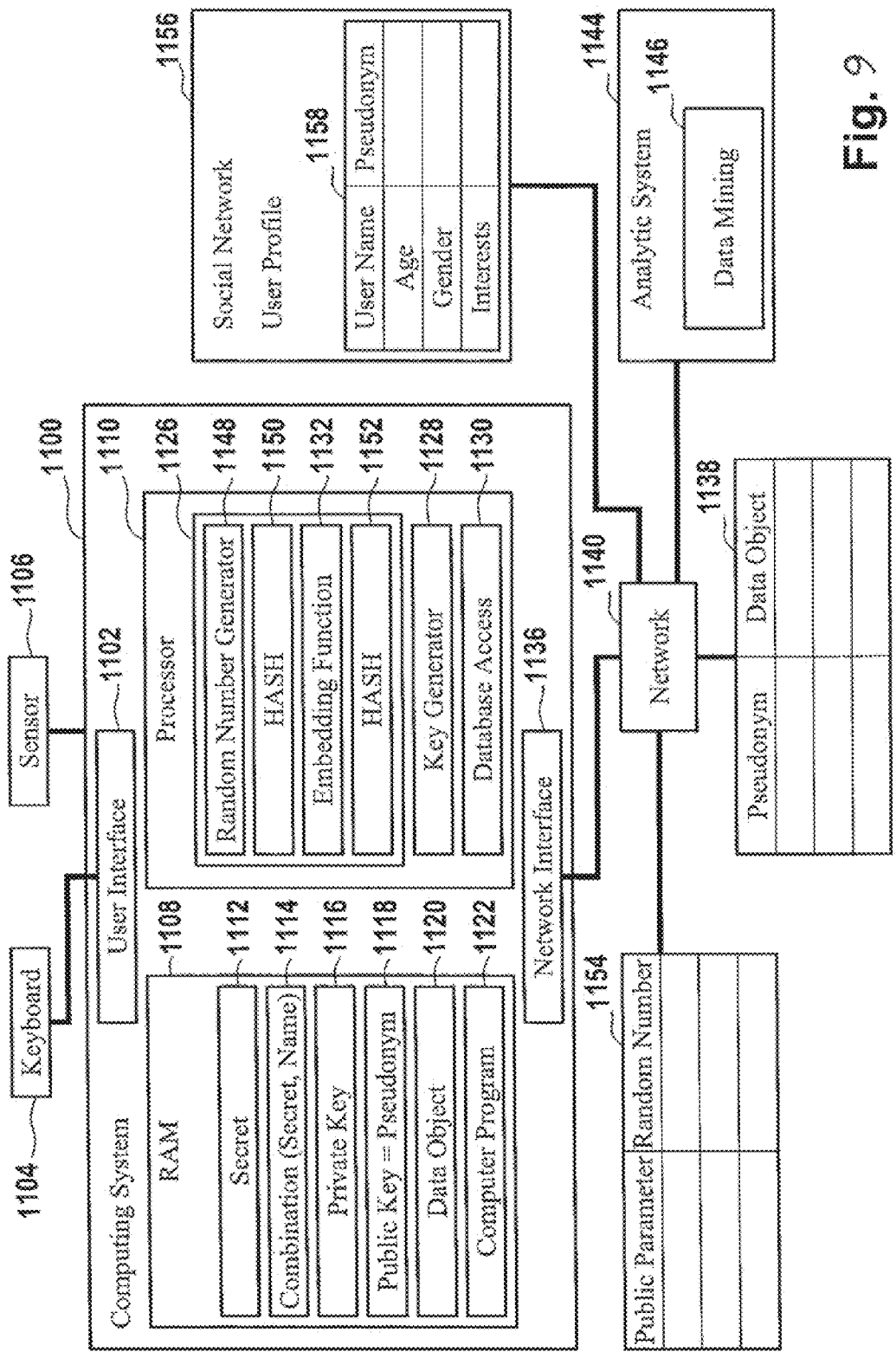
FIG. 9 is a block diagram of a further embodiment of a computer system of the invention.
Figure 10:
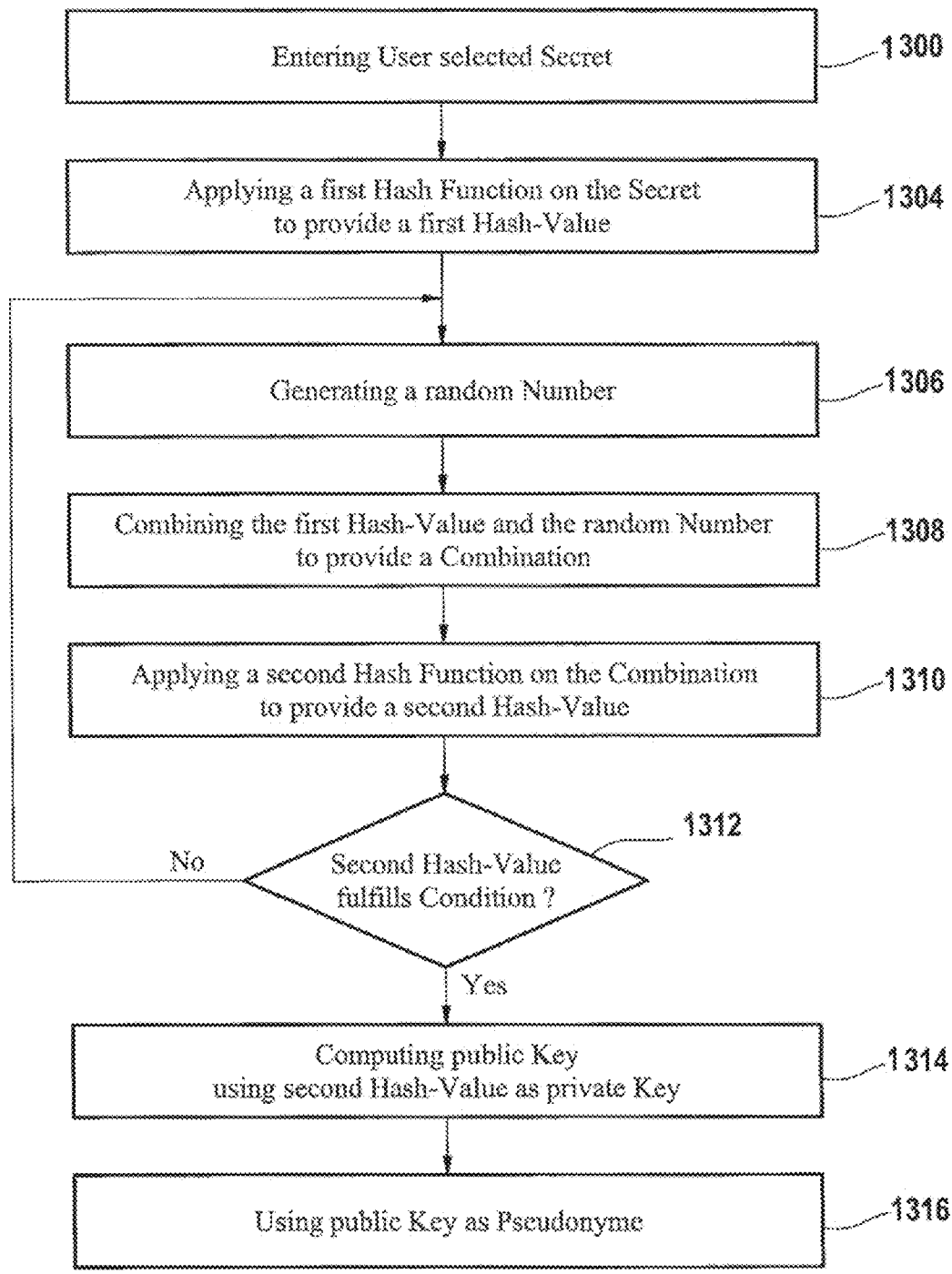
FIG. 10 is a flowchart being illustrative of a further embodiment of a method according to the invention.

In still another embodiment the embedding and randomizing function 1126 is implemented by two different hash functions and a random number generator (cf. the embodiment of FIGS. 9 and 10).

The key generator 1128 serves to compute public key 1118 using elliptic curve cryptography (ECC). The private key 1116 is multiplied by a base point given by the domain parameters of the elliptic curve which provides the public key 1118. By varying the base point and leaving the other domain parameters of the elliptic curve unchanged multiple pseudonyms can be computed for the user $T_i$ on the basis of the same secret $s_T$.

The computer system 1100 may have a network interface 1136 for coupling the computer system 1100 to a database 1138 via a communication network 1140, such as the Internet. The database access function 1130 enables to perform a write and a read access for accessing the data object 1120 stored in the database 1138 using the public key 1118, i.e. the user's pseudonym, as a database access key, e.g. a primary key or candidate key value that uniquely identifies tuples in a database relation.

Further, an analytic system 1140, such as a decision support system (DSS) can be coupled to the database 1138 such as via the network 1140. The analytic system 1144 comprises a component 1146 for analyzing the data objects of the users T which are stored in the database 1138, such as by data mining or data clustering.

In one application the data objects stored in the database 1138 contain medical data of the various users. By analyzing the various data objects using techniques such as data mining and/or data clustering techniques medical knowledge can be obtained. For example, data clustering may reveal that certain user attributes contained in the medical data increase the risk for certain diseases.

For generating a pseudonym $p_{T,i}$ for a user $T_i$ based on the secret $s_T$ 1112 and domain parameters $D_i$ containing a base point for the elliptic curve cryptography the following steps are executed by the computer system 1100 in operation:

The user $T_i$ enters his or her user-selected secret $s_T$ 1112 such as via the keyboard 1104. In addition, the user may enter at least one public parameter $V_{T,i}$ such as his name or email address via the keyboard 1104 or otherwise. Such a public parameter $V_{T,i}$ may also be permanently stored in the computer system 1100.

The secret $s_T$ 1112 is temporarily stored in memory 1108. Upon entry of the secret $s_T$ 1112 the embedding function 1132 or the embedding component of the embedding and randomizing function 1126 generates the combination 1114 of the secret $s_T$ 1112 and the public parameter $V_{T,i}$. The resultant combination 1114 is temporarily stored in the memory 1108.

Next, the randomizing function 1134 or the randomizing component of the embedding and randomizing function 1126 is invoked in order to calculate the private key 1116 on the basis of the combination 1114. The resultant private key 1116 is temporarily stored in memory 1108. In the next step, the key generator 1128 is started for computing the public key 1118 by multiplying the private key 1116 by the base point contained in the domain parameters $D_i$ of the elliptic curve being used.

The public key 1118, i.e. the pseudonym $p_{T,i}$, is stored in memory 11108. The secret $s_T$ 1112, the combination 1114 as well as the private key 1116 as well as any intermediate result obtained by execution of the embedding and randomizing function 1126 and the key generator 1128 are then erased from the memory 1108 and/or the processor 1110. As a consequence, there is no technical means to reconstruct the assignment of the resultant pseudonym to the user $T_i$ as only the user knows the secret $s_T$ 1112 that has led to the generation of his or her pseudonym $p_{T,i}$. A data object 1120 containing sensitive data of the user $T_i$, such as medical data, can then be stored by execution of the database access function 1130 in the pseudomized database 1138 using the pseudonym $p_{T,i}$ as a database access key, e.g. a primary key or candidate key value that uniquely identifies tuples in a database relation.

The user-selected secret $s_T$ 1112 may be obtained by combining a user-selected password or secret key with biometric data of the user $T_i$ that is captured by the sensor 1106. For example, a hash value of the user-selected password or secret key is calculated by execution of respective program instructions by the processor 1110. In this instance the hash value provides the user-selected secret $s_T$ 1112 on which the following calculations are based.

A plurality of users from the public set of enrolled participants T may use the computer system 1100 to generate respective pseudonyms $p_{T,i}$ and to store data objects containing sensitive data, such as medical information in the database 1138 as it has been described above in detail for one of the users $T_i$ by way of example.

For reading the data object of one of the users $T_i$ from the database 1138 the user has to enter the secret $s_T$ 1112. Alternatively, the user has to enter the user-selected password or secret key via the keyboard 1104 and an acquisition of the biometric data is performed using the sensor for computation of a hash value that constitutes $s_T$ 1112. As a further alternative, the secret key is read by the computer system from an integrated circuit chip card of the user. On the basis of $s_T$ 1112 the pseudonym can be computed by the computer system 1100.

The pseudonym is then used for performing a database read access on the database 1138 in order to read one or more data objects 1120 that are stored in the database 1138 for that user $T_i$. After the database access operation has been performed the secret $s_T$ 1112, the combination 1114, the private key 1116 and the public key 1118 are erased from the computer system 11100 as well as any intermediate computational results.

Figure 8:
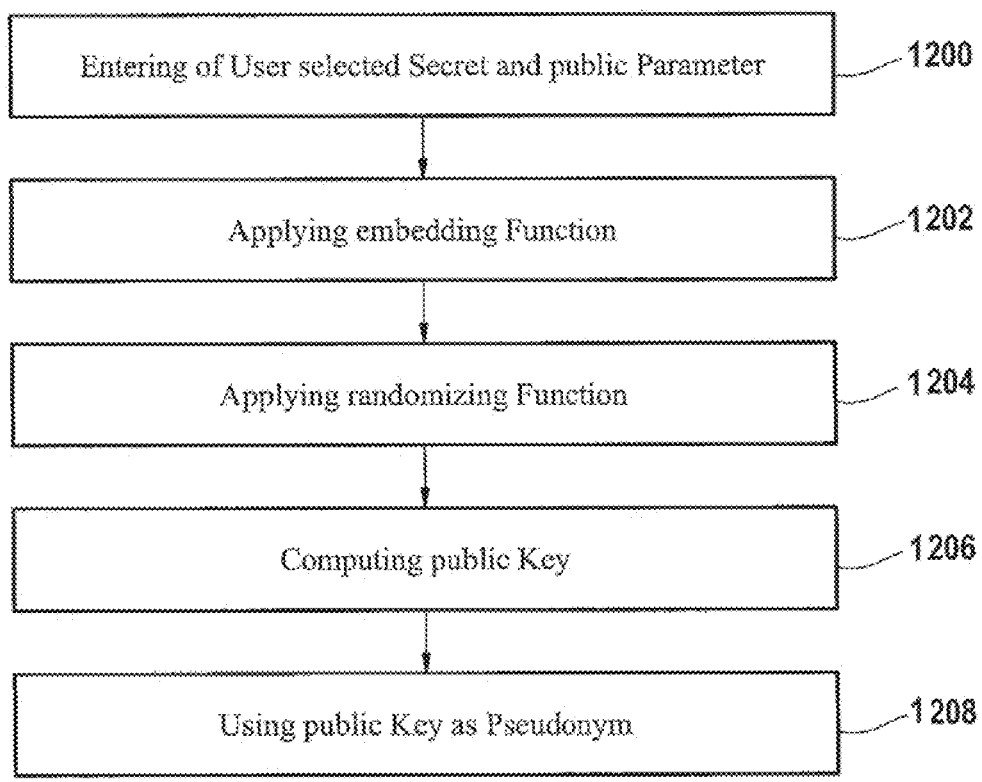
FIG. 8 is a flowchart being illustrative of a further embodiment of a method of the invention.

FIG. 8 shows a corresponding flowchart.

In step 1200 the user $T_i$ enters his or her user-selected secret $s_T$ and public parameter $V_{T,i}$. In step 1202 $s_T$ and $V_{T,i}$ are combined to provide the first combination by the embedding function (cf. embedding function 1132 of FIG. 7). Next, the randomizing function (cf. randomizing function 1134 of FIG. 7). is applied on $s_T$ and $V_{T,i}$ in step 1204 which provides a private key. As an alternative, an embedding and randomizing function is applied on $s_T$ and $V_{T,i}$ which provides the private key.

In step 1206 a public key is computed using the private key obtained in step 1204 and the public key is used in step 1208 as a pseudonym of the user $T_i$. For example the pseudonym may be used as a database access key, e.g. a primary key or candidate key value that uniquely identifies tuples in a database relation for storing a data object for the user $T_i$ in a database with pseudonymous data (cf. database 1138 of FIG. 7).

FIG. 9 shows a further embodiment of computer system 11100. In the embodiment considered here the embedding and randomizing function 1126 comprises an embedding function 1132, a random number generator 1148, a first hash function 1150 and a second hash function 1152. In the embodiment considered here the computation of the private key 1116 based on $s_T$ 1112 may be performed as follows:

The first hash function 1150 is applied on the user-selected secret $s_T$ 1112. This provides a first hash value. Next, a random number is provided by the random number generator 1148. The random number and the first hash value are combined by the embedding function 1132 to provide the combination, i.e. the embedded secret $s_T$ 1112.

The combination of the first hash value and the random number can be obtained by concatenating the first hash value and the random number or by performing a bitwise XOR operation on the first hash value and the random number by the embedding function 1132. The result is a combination on which the second hash function 1152 is applied to provide a second hash value. The second hash value is the private key 1116 on which the calculation of the public key 1118 is based.

Dependent on the implementation it may be necessary to determine whether the second hash value fulfils one or more predefined conditions. Only if such conditions are fulfilled by the second hash value it is possible to use the second hash value as the private key 1116 for the following computations. If the second hash value does not fulfill one or more of the predefined conditions a new random number is provided by the random number generator 1148 on the basis of which a new second hash value is computed which is again checked against the one or more predefined conditions (cf. the embodiment of FIG. 10).

The random number on the basis of which the private key 1116 and thereafter the public key 1118 has been computed is stored in a database 1154 that is coupled to the computer system 11100 via the network 1140. The random number may be stored in the database 1154 using the public parameter $V_{T,i}$ as the database access key for retrieving the random number for reconstructing the pseudonym at a later point of time.

The user $T_i$ may use the pseudonym provided by the computer system 1100 for his or her registration in an anonymous online community 1156 e.g. a social network. For registration the user $T_i$ creates his or her user profile 1158 by entering the pseudonym 1118 as the username such that the various private data entered into the user profile 1158 remain private even though they are published in the online community 1156 due to the fact that the assignment of the pseudonym to the user $T_i$ is stored nowhere and cannot be reconstructed by technical means without knowledge of the user-selected secret $s_T$ 1112.

For reconstructing the pseudonym the user has to enter his or her user-selected secret $s_T$ 1112 into the computer system on the basis of which the first hash value is generated by the hash function 1150 and the combination 1114 is generated by the embedding function 1132 or the embedding component of the embedding and randomizing function 1126 using the first hash value and the random number retrieved from the database 1154.

Depending on the implementation, the user may also need to enter the user's public parameter $V_{T,i}$. A database access is performed using the user's public parameter $V_T$,i as a database access key, e.g. a primary key or candidate key value that uniquely identifies tuples in a database relation, in order to retrieve the random number stored in the database 1154.

In other words, the reconstruction of the private key 1116 is performed by applying the embedding function 1132 on the first hash value obtained from the user-selected secret $s_T$ 1112 and the retrieved random number which yields the combination 1114. The first hash value is combined with the random number retrieved from the database 1154 by the embedding function 1132 to provide the combination onto which the second hash function 1152 is applied which returns the private key 1116, out of which the public key 1118, i.e. the pseudonym, can be computed. After the user $T_i$ has recovered his or her pseudonym a database access for reading and/or writing from or to the database 1138 may be performed or the user may log into the online community 1156 using his or her pseudonym for anonymous participation in the online community 1156.

FIG. 10 shows a respective flowchart for generating a pseudonym $p_{T,i}$ for user $T_i$. In step 1300 the user enters the user-selected secret $s_T$. In step 1304 a first hash function is applied on the user-selected secret $s_T$ which provides a first hash value. In step 1306 a random number is generated and in step 1308 an embedding function is applied on the first hash value and the random number to provide a combination of the first hash value and the random number. In other words, the first hash value and the random number are mapped to a 1-dimensional space, e.g. a single number, by the embedding function. The combination can be obtained by concatenating the random number and the first hash value or by performing a bitwise XOR operation on the first hash value and the random number.

In step 1310 a second hash function is applied on the combination which provides a second hash value. The second hash value is a candidate for the private key. Depending on the implementation the second hash value may only be usable as a private key if it fulfils one or more predefined conditions. For example, if ECC is used, it is checked whether the second hash value is within the interval between 2 and n−1, where n is the order of the elliptic curve.

Fulfillment of such a predefined condition is checked in step 1312. If the condition is not fulfilled, the control returns to step 1306. If the condition is fulfilled, then the second hash value qualifies to be used as a private key in step 1314 to compute a respective public key providing an asymmetric cryptographic key-pair consisting of the private key and the public key. In step 1316 the public key computed in step 1314 is used as a pseudonym such as for accessing a pseudomized database, participation in an anonymous online community or other purposes.

Mathematical Appendix

1. Embedding Functions.

There exist n-ary scalar functions $$d: N \times N \to N_d$$

which are injective—and even bijective, where N is the set of natural numbers. The function d( ) embeds uniquely an n-dimensional space, i.e. n-tuples $(k_1, \ldots, k_n)$, into scalars, i.e. natural numbers k.

2. The Binary Cantor Pairing Function

The binary cantor pairing function π is an embodiment of embedding function 1132. The binary cantor pairing function is defined as follows:

$$\pi_N^2 : N \times N \to N$$

$$\pi(m, n) = \frac{1}{2}(m + n)(m + n + 1) + n$$

which assigns to each fraction m/n the unique natural number $\pi(m, n)$—thus demonstrating that there are no more fractions than integers. Hence, if we map both $s_T$ and $V_T$,i to natural numbers and use the fact that all identities are distinct then $\pi(s_T, V_T, i)$ yields a unique value for each identity, even if there are equal personal secrets. To be more precise, since this function does not distinguish between e.g. ½, ²⁄₄ etc, it assigns to each fraction an infinite number of unique natural numbers.

3. Elliptic Curve Cryptography (ECC)

Let:
p be a prime number, p>3, and $\mathbb{F}_p$ the corresponding finite field
a and b integers
Then the set E of points (x, y) such that $$E = \{(x,y) \in \mathbb{F}_p \times \mathbb{F}_p | y^2 = x^3 + ax + b\} \tag{F1}$$

defines an elliptic curve in $\mathbb{F}_p$. (For reasons of simplicity, we skip the details on E being non-singular and, as well, we do not consider the formulae of elliptic curves over finite fields with p=2 and p=3. The subsequent statements apply to these curves, too.) The number m of points on E is its order.

Let P,Q ∈ E be two points on E. Then the addition of points $$P + Q = R \text{ and } R \in E \tag{F2}$$

can be defined in such a way that E forms an Abelian group, viz, it satisfies the rules of ordinary addition of integers. By writing $$P + P = [2]P$$

We define the k-times addition of P as [k]P, the point multiplication.

Now EC-DLP, the elliptic curve discretionary logarithm problem, states that if $$Q = [k]P \tag{F3}$$

then with suitably chosen a, b, p and P, which are known to public, and the as well known to the public point Q it is computationally infeasible to determine the integer k.

The order n of a point P is the order of the subgroup generated by P, i.e. the number of elements in the set $$\{P, [2]P, \ldots, [n]P\} \tag{F4}$$

With all this in mind we define an elliptic curve cryptographic (ECC) system as follows. Let:
E be an elliptic curve of order m
B ∈ E a point of E of order n, the base point
Then $$D = \{a, b, p, B, n, co(B)\} \tag{F5}$$

with $$co(B) = \frac{m}{n}$$

defines a set of domain ECC-parameters. Let now g be an integer and $$Q = [g]B \tag{F6}$$

Then (g, Q) is an ECC-key-pair with g being the private key and Q the public key.

For we rely on findings of Technical Guideline TR-03111, Version 1.11, issued by the Bundesamt für Sicherheit in der Informationstechnik (BSI), one of the best accredited source for cryptographically strong elliptic curves, we can take that m=n, i.e. co(B)=1, and hence reduce (F5) to $$D = \{a, b, p, B, n\} \tag{F7}$$

Now we can define our one-way function. Let D be a set of domain parameters concordant with (F7). Then $$f: [2, n-1] \to E$$

$$k \mapsto [k]B \tag{F8}$$

i.e. the point multiplication (F6), is an injective one-way function.

4. Implementing Key Generator Based on ECC

The key generator 1128 (cf. FIGS. 7 and 9) can be implemented using ECC.

Definitions:

There are public sets of ECC-domain parameters $D_1$, $D_2, \ldots$ concordant with (F7)

$$D_i = \{a_i, b_i, p_i, B_i, n_i\} \quad (F9)$$

There are public functions: an embedding function d( ), a randomising function r( ) and our one-way function f( ) defined by (F8).

There is a public set of enrolled participants (users)

$$T = \{T_1, T_2, \ldots\} \quad (F10)$$

Note that a $T_i$ does not necessarily possess any personally identifying details, i.e. we assume that T resembles the list of participants in an anonymous Internet-community, in which each participant can select his name at his discretion as long as it is unique.

Each participant $T \in T$ chooses at his complete discretion his personal secret $s_T$. In particular, for this secret is never revealed to anybody else—it is the participant's responsibility to ensure this—it is not subject to any mandatory conditions, such as uniqueness.

Our pseudonym derivation function is $$h(\ ) = f(r(d(\ ))) \quad (F11)$$

with the following properties:

Given a $T \in T$ with his $s_T$, a $D_i$ and $T$, $D_i \in V_{T,i}$ $$r(d(s_T, V_{T,i})) = g_{T,i} \quad (F12)$$

where $g_{T,i}$ is a unique and strong, i.e. sufficiently random, private ECC-key for $D_i$.

The pseudonym $p_{T,i}$ corresponding to T, $s_T$ and $D_i$ is $$p_{T,i} = f(g_{T,i}, D_i) = [g_{T,i}]B_i = (x_{T,i}, y_{T,i}) \quad (F13)$$

There is a public set of pseudonyms $$P = \{p_1, p_2, \ldots\} \quad (F14)$$

such that P comprises one or more pseudonyms for each participant in T computed according to (F11). This wording implies that here is no recorded correspondence between a participant in T and his pseudonyms in P, i.e. each $p_{T,i}$ is inserted in an anonymous way as $p_k$ into P.

Remarks:

The use of multiple domain parameters enables us to endow a single participant with a single personal secret with multiple pseudonyms. This in turn enables a participant to be a member of multiple pseudonymous groups such that data of these groups cannot—for, e.g. personal or legal reasons—be correlated. Therefore, attempts to exploit combined pseudonymous profiles for unintended, possibly malicious purposes, are of no avail.

The distinction between two sets of domain parameters $D_i$ and $D_j$ can be minor. In accordance with our principle to use only accredited domain parameters, e.g. those listed in BSI TR-03111, we can set $$D_i = \{a, b, p, B, n\} \quad (F15)$$

by swapping B for a statistically independent $B_2$, i.e. by choosing a different base point, we can set $$D_j = \{a, b, p, B_2, n\} \quad (F16)$$

For $D_i$ and $D_j$ refer to the same elliptic curve we can have only one function (F12) and introduce the crucial distinction with (F13). This vastly simplifies concrete implementations—we select a suitable curve and vary the base points only.

LIST OF REFERENCE NUMERALS

100 database
102 user account or starting node
102a to 102e individual user account nodes
104 intermediate node or representation of user group
104a to 104d individual intermediate nodes
106 intermediate node or representation of directory
106a to 106c individual intermediate nodes
108 data record or ending node
108a to 108g individual data records
110 private keys corresponding to user accounts
110a to 110e user private key
111a to 111e encrypted private keys
112 public key
118 public key
120 encrypted private key
122 public key
124 data file
200 database system
202 processor
204 computer storage
206 computer memory
208 computer program
210 key signing authority module
212 computer system of user 1
214 computer system of user 2
216 computer system of user 3
218 computer system of user 4
220 computer system of user 5
222 network
224 computer storage
226 computer memory
228 processor
230 private key cache
232 decrypted data file 124
234 computer program
236 cryptographic key generation module
238 cryptographic module
1100 computer system
1102 user interface
1104 keyboard
1106 sensor
1108 memory
1110 processor
1112 a user-selected secret
1114 combination
1116 private key
1118 public key
1120 data object
1122 computer program instructions
1124 combination generator
1126 embedding and randomizing function
1128 key generator
1130 database access function
1132 embedding function
1134 randomizing function
1136 network interface
1138 database
1140 network
1144 analytic system
1146 component
1148 random number generator 1150 hash function
1152 hash function
1154 database
1156 online community
1158 user profile

What is claimed is:

1. A database system comprising:
a memory containing multiple data records, wherein each of the data records has a data record asymmetric key pair for cryptographic encryption and decryption, wherein each data record asymmetric key pair comprises a data record public key and a data record private key, wherein each of the multiple data records is at least partially encrypted by its data record public key, wherein the data record private key of each asymmetric key pair is encrypted, wherein the memory contains a representation of a directed acyclic graph, wherein paths along the directed acyclic graph each have a starting node and an ending node, forming a chain of nodes;
a set of user accounts, wherein each of the user accounts has a user asymmetric key pair for encryption and decryption, wherein each user asymmetric key pair has a user public key and a user private key, wherein the user public key is computed using the user private key; wherein each starting node corresponds to one of the set of user accounts, wherein each ending node corresponds to one of the multiple data records;
wherein data is added to a data record by encrypting it with the data record public key, wherein access to the data record is granted to a user account by a cryptographic access key encrypted with the user public key, wherein a directed path formed by the chain of nodes starting at the starting node and ending at the ending node allows decryption of the data record using the cryptographic access key.

2. The database system of claim 1, wherein the memory contains a representation of a directed acyclic graph, wherein paths along the directed acyclic graph each have a starting node and an ending node, wherein each starting node corresponds to one of the set of user accounts, wherein each ending node corresponds to one of the multiple data records, wherein a directed path from the starting node to the ending node allows decryption of the data record using the cryptographic access key.

3. The database system of claim 2, wherein each node has a node asymmetric key pair with a node private key and a node public key, wherein the node asymmetric key pair of the starting node is the user asymmetric key pair, wherein the node asymmetric key pair of the ending node is the data record key pair.

4. The database system of claim 3, wherein nodes along a directed path form a chain of nodes starting at the starting node and ending at the ending node, wherein each of the nodes contains a node data record, wherein the node data record comprises the node public key, wherein the data record further comprises the encrypted private key of the next node in the chain of nodes, wherein the private key of next node is encrypted using the node public key.

5. A computer system for accessing a database of a database system, wherein the database system comprises:
a memory containing multiple data records, wherein each of the data records has a data record asymmetric key pair for cryptographic encryption and decryption, wherein each data record asymmetric key pair comprises a data record public key and a data record private key, wherein each of the multiple data records is encrypted by its data record public key, wherein the data record private key of each asymmetric key pair is encrypted, wherein the memory contains a representation of a directed acyclic graph, wherein paths along the directed acyclic graph each have a starting node and an ending node, forming a chain of nodes;
a set of user accounts, wherein each of the user accounts has a user asymmetric key pair for encryption and decryption, wherein each user asymmetric key pair has a user public key and a user private key, wherein the user public key is computed using the user private key; wherein each starting node corresponds to one of the set of user accounts, wherein each ending node corresponds to one of the multiple data records;
wherein data is added to a data record by encrypting it with the data record public key; wherein access to the data record is granted to a user account by a cryptographic access key encrypted with the user public key; wherein a directed path formed by the chain of nodes starting at the starting node and ending at the ending node allows decryption of the data record using the cryptographic access key;
wherein the computer system comprises:
a processor; and
a computer-readable storage medium containing machine-readable instructions for execution by the processor, wherein execution of the instructions cause the processor to perform the steps of:
decrypting the cryptographic access key with the user private key,
using the cryptographic access key for decrypting the data record.

6. The computer system of claim 5, wherein the execution of the instructions further cause the processor:
encrypting a data file with the data record public key; and
writing the encrypted data file to the data record.

7. The computer system of claim 6, wherein execution of the instructions further cause the processor to perform the step of digitally signing the data record before writing the encrypted data record to the database.

8. The computer system of claim 5, wherein the memory contains a representation of a directed acyclic graph, wherein paths along the directed acyclic graph each have a starting node and an ending node, wherein each starting node corresponds to one of the set of user accounts, wherein each ending node corresponds to one of the multiple data records, wherein a directed path from a starting node to an ending node allows decryption of the data record using the cryptographic access key.

9. The computer system of claim 8, wherein each node has a node asymmetric key pair with a node private key and a node public key, wherein the node asymmetric key pair of the starting node is the user asymmetric key pair, wherein the node asymmetric key pair of the ending node is the data record key pair.

10. The computer system of claim 9, wherein nodes along the directed path form a chain of nodes starting at the starting node and ending at the ending node, wherein each of the nodes contains a node data record, wherein the node data record comprises the node public key, wherein the data record further comprises the encrypted private key of the next node in the chain of nodes, wherein the private key of each next node is encrypted using the node public key, wherein using the cryptographic access key for decrypting the data record comprises:
successively decrypting the node private keys of the chain of nodes; and decrypting the data record using the data record private key.

11. The computer system of claim 10, wherein the instructions further cause the processor to perform the steps of:
encrypting a node private key with the user public key; and
writing the encrypted node private key to the database system.

12. The computer system of claim 10, wherein the instructions further cause the processor to:
accessing a new data record;
generating a new record asymmetric key pair, wherein the new record asymmetric key pair comprises a new record private key and a new record public key;
encrypting the new data record at least partially with the new record public key;
encrypting the new data record private key with the public key of a node chosen from the representation of the directed acyclic graph; and
writing the encrypted new data record, the new record public key, and the encrypted new record private key to the memory of the database.

13. The computer system of claim 10, wherein the instructions further cause the processor to perform the steps of:
creating a new node key pair, wherein the new node key pair is an asymmetric key pair which comprises a new node public key and a new node private key;
encrypting a private key of a first existing node using the new node public key;
encrypting the new node private key using a public key of a second existing node; and
writing the new node public key, the encrypted private key of a first existing node, and the encrypted new node private key to the memory of the database system.

14. The computer system of claim 10, wherein the instructions further cause the processor to perform the step of caching the decrypted node private keys in the computer-readable storage medium for future use.

15. The computer system of claim 5, wherein execution of the instructions further causes the processor to:
receiving a user-selected secret,
storing the user-selected secret in a memory,
computing the user private key by applying an embedding and randomizing function onto the secret,
storing the user private key in the memory,
computing the user public key using the user private key,
erasing the secret and the user private key from the memory, and
storing the user public key in one of the set of user accounts.

16. A non-transitory computer-readable storage medium containing instructions for execution by a processor of a computer system for accessing a database of a database system, wherein the database system comprises:
a memory containing multiple data records, wherein each of the data records has a data record asymmetric key pair for cryptographic encryption and decryption, wherein each data record asymmetric key pair comprises a data record public key and a data record private key, wherein each of the multiple data records is at least partially encrypted by its data record public key, wherein the data record private key of each asymmetric key pair is encrypted, wherein the memory contains a representation of a directed acyclic graph, wherein paths along the directed acyclic graph each have a starting node and an ending node, forming a chain of nodes;
a set of user accounts, wherein each of the user accounts has a user asymmetric key pair for encryption and decryption, wherein each user asymmetric key pair has a user public key and a user private key, wherein the user public key is computed using the user private key; wherein each starting node corresponds to one of the set of user accounts, wherein each ending node corresponds to one of the multiple data records;
wherein data is added to a data record by encrypting it with the data record public key; wherein access to the data record is granted to a user account by a cryptographic access key encrypted with the user public key; wherein a directed path formed by the chain of nodes starting at the starting node and ending at the ending node allows decryption of the data record using the cryptographic access; and
wherein execution of the instructions cause the processor to perform the steps of:
decrypting the cryptographic access key with the user private key,
using the cryptographic access key for decrypting the data record.

* * * * *